US010803428B2

(12) United States Patent
Sheehan et al.

(10) Patent No.: US 10,803,428 B2
(45) Date of Patent: Oct. 13, 2020

(54) METHOD, NON-TRANSITORY COMPUTER-READABLE MEDIUM, AND SYSTEM FOR PAYMENT APPROVAL

(71) Applicant: GreenLight Financial Technology, Inc., Decatur, GA (US)

(72) Inventors: Timothy Sheehan, Decatur, GA (US); Melissa Murphy, Decatur, GA (US)

(73) Assignee: Greenlight Financial Technology, Inc., Atlanta, GA (US)

( * ) Notice: Subject to any disclaimer, the term of this patent is extended or adjusted under 35 U.S.C. 154(b) by 649 days.

(21) Appl. No.: 14/822,526

(22) Filed: Aug. 10, 2015

(65) Prior Publication Data

US 2017/0046665 A1 Feb. 16, 2017

(51) Int. Cl.
*G06Q 30/00* (2012.01)
*G06Q 20/10* (2012.01)
*G06Q 20/38* (2012.01)
*G06Q 30/06* (2012.01)

(52) U.S. Cl.
CPC .......... *G06Q 20/10* (2013.01); *G06Q 20/382* (2013.01); *G06Q 30/0609* (2013.01); *G06Q 30/0633* (2013.01); *G06Q 30/0635* (2013.01); *G06Q 30/0637* (2013.01)

(58) Field of Classification Search
CPC . G06Q 30/0601–0645; G06Q 30/0609; G06Q 30/0637; G06Q 30/0635; G06Q 30/0633; G06Q 20/10; G06Q 20/382; G06Q 20/405
USPC ..... 705/26.1–27.2, 39, 44, 18, 26.35, 26.82, 705/26.81, 26.8
See application file for complete search history.

(56) References Cited

U.S. PATENT DOCUMENTS

| | | | |
|---|---|---|---|
| 6,226,624 B1* | 5/2001 | Watson | G06Q 20/00 705/2 |
| 6,327,348 B1 | 12/2001 | Walker et al. | |
| 8,014,756 B1 | 9/2011 | Henderson | |
| 8,622,309 B1 | 1/2014 | Mullen et al. | |
| 8,868,458 B1 | 10/2014 | Sterbuck et al. | |
| 2003/0028481 A1* | 2/2003 | Flitcroft | G06Q 20/00 705/39 |
| 2006/0116957 A1 | 6/2006 | May et al. | |
| 2006/0167756 A1 | 7/2006 | Vonbergen et al. | |
| 2009/0119241 A1 | 5/2009 | Fano | |

(Continued)

OTHER PUBLICATIONS

O'Brien, Ciara. PennyOwl Pocket Money App to Launch. Apr. 9, 2015 (Apr. 9, 2015). Irish Times [Dublin]. (Year: 2015).*

(Continued)

*Primary Examiner* — Allison G Wood
(74) *Attorney, Agent, or Firm* — Smith Gambrell & Russell LLP

(57) ABSTRACT

A purchase approval platform may be provided. Embodiments of the present disclosure may receive, from a requestor, a purchase request comprising request details. The purchase request may then be provided to the decision maker. The decision maker may be enabled to approve or decline approval of the purchase request from the decision maker. Upon receiving an approval, the platform may receive checkout details associated with the purchase request. The platform may compare the checkout details to the request details. If the checkout details match the request details, the platform may enable a completion of a transaction associated with the purchase request.

20 Claims, 20 Drawing Sheets

(56) References Cited

U.S. PATENT DOCUMENTS

| | | |
|---|---|---|
| 2009/0125440 A1 | 5/2009 | Maeng |
| 2010/0017302 A1 | 1/2010 | Scipioni |
| 2010/0114733 A1* | 5/2010 | Collas .................. G06Q 20/12 705/26.1 |
| 2012/0150736 A1 | 6/2012 | Dickerson et al. |
| 2012/0278202 A1 | 11/2012 | Webber |
| 2013/0018792 A1* | 1/2013 | Casey .................. G06Q 40/02 705/44 |
| 2013/0110670 A1 | 5/2013 | Webber et al. |
| 2014/0087690 A1 | 3/2014 | Williams |
| 2014/0188715 A1 | 7/2014 | Barlok et al. |
| 2014/0244493 A1 | 8/2014 | Kenyon et al. |
| 2014/0279459 A1 | 9/2014 | Weiss et al. |
| 2015/0100500 A1 | 4/2015 | Pasupulati |

OTHER PUBLICATIONS

Extended European Search Report and Search Opinion pursuant to Rule 62 EPC released on Mar. 7, 2019 by the European Patent Office for corresponding application No. 16835797.8; 6 pages.

Communication pursuant to Article 94(3) issued by the European Patent Office dated Jun. 3, 2020 for corresponding European Patent Application No. 16 835 797.8; 9 pages.

Final Office Action issued by the U.S Patent & Trademark Office in corresponding U.S. Appl. No. 14/822,567 dated Dec. 27, 2019; 39 pages.

* cited by examiner

METHOD, NON-TRANSITORY COMPUTER-READABLE MEDIUM, AND SYSTEM FOR PAYMENT APPROVAL

RELATED APPLICATIONS

The following related U.S. Patent Applications, filed on even date herewith in the name of Greenlight Financial Technology, Inc. assigned to the assignee of the present application, are hereby incorporated by reference:

U.S. patent application Ser. Nos. 14/822,548, 14/822,567; and

14/822,593.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to approval of commercial transactions.

BACKGROUND

Electronic funds transfer (EFT) is the electronic transfer of money from one bank account to another through computer-based systems. EFT includes, for example, cardholder-initiated transactions (e.g. using a payment card such as a credit or debit card). Credit cards, debit cards, charge cards and smart cards are popular tools for electronic payment transactions. Further, new technology is emerging including such as for example, smart phone payments (e.g., Apple Pay). EFTs may be made in person, for example, at a point of sale, or online, for example, via an e-commerce platform.

Currently, if a first individual ('decision maker') lends his/her payment card to a second individual ('requestor'), the first individual has no direct control over how the second individual uses the payment card. For example, a father may lend his son a credit card to purchase school supplies. Using current systems, the father may be able to use a spending limit to restrict the amount that the son spends. However, the father will not have direct control over whether the son buys school supplies or instead makes other purchases.

Brief Overview

A payment approval platform may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A purchase approval platform may be provided. Embodiments of the present disclosure may receive, from a requestor, a purchase request comprising request details. The purchase request may then be provided to the decision maker. The decision maker may be enabled to approve or decline approval of the purchase request from the decision maker. Upon receiving an approval, the platform may receive checkout details associated with the purchase request. The platform may compare the checkout details to the request details. If the checkout details match the request details, the platform may enable a completion of a transaction associated with the purchase request.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
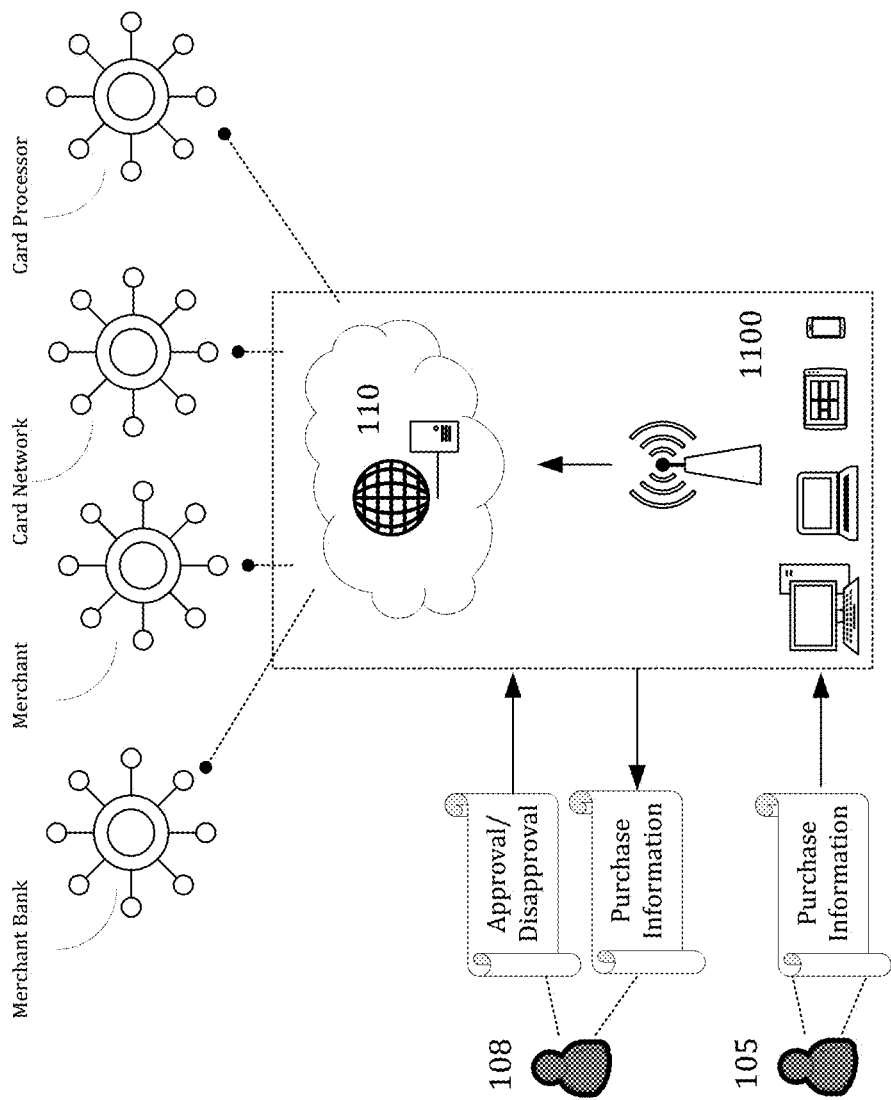
FIG. 1A illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. As should be understood, any embodiment may incorporate only one or a plurality of the above-disclosed aspects of the display and may further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112,¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of parents controlling their children's spending, embodiments of the present disclosure are not limited to use only in this context. For example, companies may employ embodiments of the present disclosure for controlling travel budgeting and expenses. Additionally, while many aspects, features, and examples relate to, and are described in, the context of purchasing merchandise at a point of sale, embodiments of the present disclosure are not limited to this context. For example, embodiments of the present disclosure may be used for approving any transaction, including, for example, purchases of services and e-commerce purchases. Further, while the term 'card' is used to reference a payment method used, any other payment method may be used. For example, electronic checking, and other types of electronic fund transfers and associated institutions may be implemented in embodiments of the present disclosure.

I. Platform Overview

Consistent with embodiments of the present disclosure, a payment approval platform may be provided. This overview is provided to introduce a selection of concepts in a simplified form that are further described below. This overview is not intended to identify key features or essential features of the claimed subject matter. Nor is this overview intended to be used to limit the claimed subject matter's scope. The payment approval platform may be used by individuals or companies to approve or decline purchases in real time.

Embodiments of the present disclosure may enable a "purchasing party" to remotely request and receive approval for, for example, a card transaction from a "decision maker party". Once approval is received from the decision maker party, a card processor associated with the card may enable the transaction to occur. As will be further detailed below, the request and approval process between the purchasing party and the deciding party may enable the setting of certain parameters and conditions on the transaction (e.g., amount, location, time, and the like). The approved transaction, in turn, would be limited, by the processor, to the parameters and conditions set for the transaction.

Embodiments of the present disclosure may first enable users to create accounts. Accounts may be attached to requestors and/or decision makers (or collectively, 'users'). For example, the parent may be a decision maker and a teenager may be a requestor. In some embodiments, the requestor and the decision maker may be the same person.

Accounts may be associated with user information including, for example, user name, address, email, date of birth, gender, and password, and one or more accounts (e.g., bank and/or card) associated with the user. Decision maker accounts may then be connected to requestor accounts. For example, a requestor may be associated with one or more decision makers. In this way, both a father and mother may serve as, for example, a decision maker for their teenage son and/or daughter. In some embodiments, the decision maker must be at least 18 years of age. In such embodiments, the platform may require age confirmation. In further embodiments, the decision maker may be the provider of funds.

For example, the decision maker (e.g., parent) may register and associate one or more payment methods (e.g., credit card, debit card, prepaid card, bank account, etc.) with his or her account. The decision maker may further register and associate one or more requestors (e.g., children and teens) with his or her account and associate one or more payment methods with each requestor. In some embodiments, the decision maker may control a master account, while each requestor may use a sub-account associated with the master account.

For each transactional approval requested by the requestor, a platform consistent embodiments of the present disclosure may enable the requestor to provide details of the desired purchase. For example, the teenager (e.g., purchasing party) may input, through a mobile phone based application, purchase details for an item she wants to purchase, such as, for example, a description, price, store, photo, and date and time of purchase. The platform may further require requestor account authentication, for example, by requiring the requestor to log in. A login may be performed, for example, by requiring a username, password, biometric indicator (e.g., fingerprint scan), confirmation via a mobile phone or device associated with the requestor, or various other methods for authenticating requestor identity.

The platform may then notify the parent (e.g., decision maker party associated with the purchasing party) of the desired purchase pending approval including the details of the desired purchase. Notification may be received by the parent through, for example, but not limited to, a similar mobile phone based application associated with the platform. The platform may then enable the parent to, for example, approve, reject approval, or modify the purchase request (e.g., reduce the amount available for spending) and then approve the desired purchase. The platform may further require decision maker account authentication, for example, by requiring the decision maker to log in. A login may be performed, for example, by requiring a username, password, biometric indicator (e.g., fingerprint scan), confirmation via a mobile phone or device associated with the decision maker, or various other methods for authenticating decision maker identity.

Upon receiving approval from the decision maker, a transaction may be executed by the requestor. Still consistent with embodiments of the present disclosure, the platform may be in operative communication with merchant banks, card processors, and other financial transaction institutions associated with the transaction (hereinafter referred to as "payment processor"). To further enable the platform's operative communication with the payment processor, a card may be associated with the requestor's and decision makers' platform accounts. In this way, and as will be detailed below, the platform may verify that the parameters of the actual transaction may match the approved transaction details.

The platform may then enable, for example, a purchase in an amount up to the approved amount at the approved store, on the approved date and time. Accordingly, embodiments of the present disclosure may cause the card to be activated or deactivated for purchasing within the scope of the purchase details or applying a restriction thereto. After completing the transaction, the platform may provide the requestor and decision maker with a notification. The notification may include a reminder to take a picture of a receipt associated with the purchase.

In certain embodiments, approved purchases may be made recurring, such as, for example, a weekly grocery budget. Embodiments of the present disclosure may display to users the past purchases, purchases pending approval, approved purchases, recurring purchases, and rejected purchases. Further information, such as, for example, comments, may additionally be provided to users.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1A illustrates one possible operating environment through which a platform 100A consistent with embodiments of the present disclosure may be provided. By way of non-limiting example, a payment approval platform 100 may be hosted on a centralized server 110, such as, for example, a cloud computing service. A requestor 105 may access platform 100 through a software application. A decision maker 108 may access platform 1100 through the same or an associated software application. In some embodiments, the requestor 105 and the decision maker 108 may be one and the same user.

The software applications may be embodied as, for example, but not be limited to, a website, a web application, a desktop application, and a mobile application compatible with a computing device 1100. One possible embodiment of the software application may be provided by the Green-Light™ suite of products and services provided by Green-Light Me, Inc.

The platform 100 may further be accessed by financial networks, such as, for example, a merchant bank, a merchant, a card network, and a card processor. In some embodiments, the card processor may be provided by, or associated with, for example, the platform provider.

The merchant bank may be an entity that provides merchant products and services needed to process payment cards. It may act as an intermediary between merchants, issuing banks, and card networks throughout the process. Further, the merchant bank may be responsible for depositing the transaction proceeds into merchant's designated bank account.

As will be detailed with reference to FIG. 11 below, the computing device(s) through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

Referring again to FIG. 1A, a first user 105 ('requestor') may utilize a software or web application (e.g., a component of platform 100) on his or her respective a first computing device (e.g., configured as computing device 1100) to identify a desired transaction. The desired transaction details and the first user's credentials (e.g., login information, device ID, location information, Internet Protocol (IP) information, and the like) may be associated with a first authentication factor.

The desired transaction and the first user's credentials may be sent to a central database which may be located in, for example, but not limited to, a cloud environment or at a central location (e.g., server 110). The central database may route the request to the authorized grantor ('decision maker'), second user 108. The grantor may be an individual utilizing the software or web application (e.g., a component of platform 100) on a second computing device (e.g., configured as computing device 1100) and may authorize or deny the request. The grantor's access to the information may provide a second authentication factor.

If approved, the requestor may be notified via the central database and effect the transaction using a payment device. The payment device may comprise, for example, but not limited to, a credit, debit, or prepaid card, or virtual money account such as, for example, but not limited to, Apple Pay. The central database may upload transactional related information to a payment device issuing bank and may modify a respective payment device transactional record to include the parameters related to the desired transaction.

When the transactional record is transmitted via the card network to the issuing bank, the updated payment device transactional record may be compared to the actual transactional record. And if certain updated parameters match, such as, for example, amount, geo code (e.g., GPS coordinates), time, category or the like, then the transaction may be approved. If the information does not match, the transaction may be denied. This may provide a third factor of authentication.

Figure 1B:
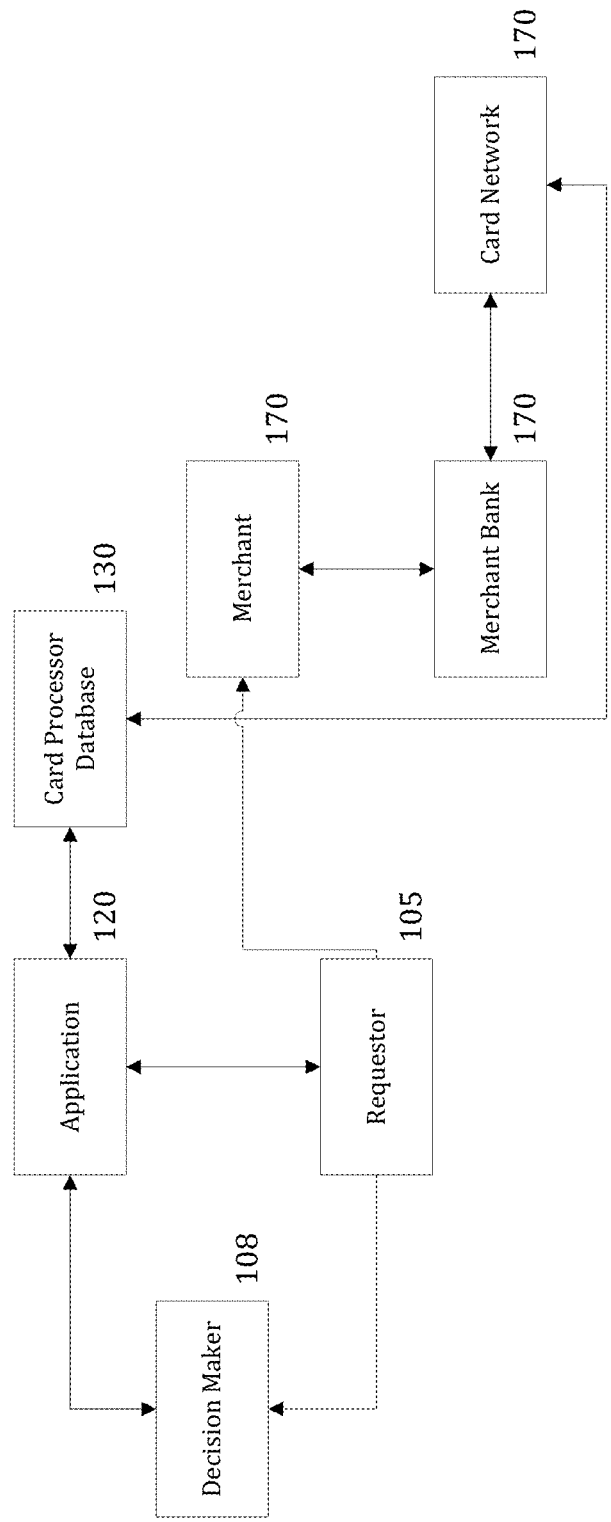
FIG. 1B illustrates a block diagram of an operating environment consistent with the present disclosure.

FIG. 1B illustrates an operating environment for a typical retail purchase 100B made by a requestor 105 using the software application 120 and a platform card. The requestor 105 (e.g., a teenager) may use the software application to request a purchase for a specific item with specific item parameters (e.g., pants, $75, J Crew, at Lenox Mall, on Sep. 30, 2014). The requestor may select a specific decision maker 108 for approving the request. The decision maker 108 (e.g., a parent) may receive the request and approve or decline the request via the software application. Upon approval, the software application 120 may update the card processor's database 130 to reflect specific purchase parameters (e.g., card status, transaction categories, geo-fence coordinates, time frame for purchase, and individual transaction maximum amount). Merchant 140 may process the platform card and transaction information and request an authentication from a merchant bank 150. The merchant bank 150 may submit authentication to a card network 160. The card network 160 may send a request to the card processor's database 130.

The card processor's database 130 may compare the transaction information with the parameters approved by the decision maker 108 and approve or decline the transaction as an authentication response. Card network 160 may forward the authentication response to the merchant bank 150. Merchant bank 150 may forward the response to the merchant 140. The merchant 140 may receive the authentication response and complete the transaction according to the authentication response. If approved, the requestor 105 may successfully complete the purchase. Software application 120 may set a card status to suspended/inactive with the card processor's database 130.

Figure 1C:
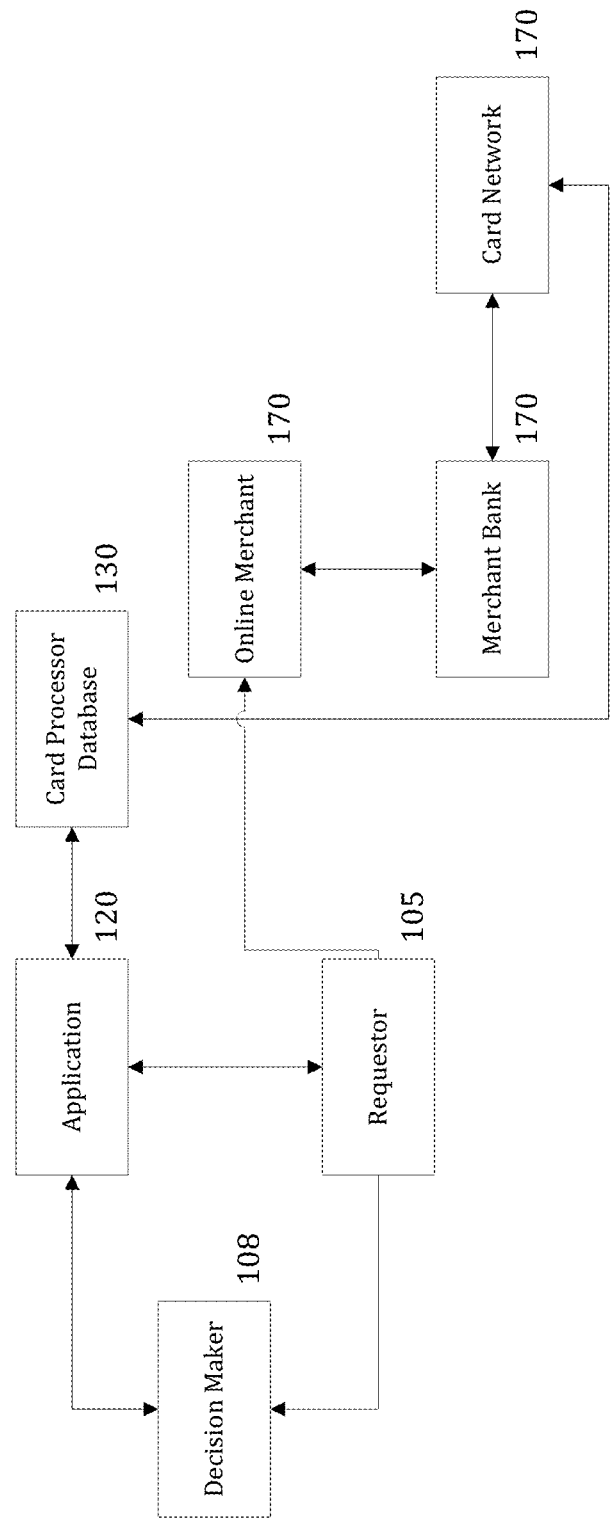
FIG. 1C illustrates a block diagram of an operating environment consistent with the present disclosure.

FIG. 1C illustrates an operating environment for a typical e-commerce purchase 100C made by a requestor 105 using the software application 120 and a platform card. The requestor 105 (e.g., a teenager) may use the software application to request a purchase for a specific item with specific item parameters (e.g., pants, $75, J Crew, at Lenox Mall, on Sep. 30, 2014). The item parameters may be submitted, for example, by sending a link to an online merchant's platform (e.g., a uniform resource locator (URL)) corresponding to the desired items into the software application 120. This may be done, for example, when the requestor clicks a link within an internet browser while shopping on an online merchant's e-commerce site. The requestor may select a specific decision maker 108 (e.g., a parent) for approving the request. The decision maker 108 may receive the request for example, the link. Additionally, the platform may retrieve product details from the e-commerce site and send the product details to the decision maker. The decision maker may then approve or decline the request via the software application. Upon approval, the software application 120 may update the card processor's database 130 to reflect specific purchase parameters (e.g., card status, transaction categories, geo-fence coordinates, time frame for purchase, and individual transaction maximum amount). Merchant 140 may process the platform card and transaction information and request an authentication from a merchant bank 150. In some embodiments, the platform may provide an automated checkout method as further described herein. The merchant bank 150 may submit authentication to a card network 160. The card network 160 may send a request to the card processor's database 130. The card processor's database 130 may compare the transaction information with the parameters approved by the decision maker 108 and approve or decline the transaction as an authentication response. Card network 160 may forward the authentication response to the merchant bank 150. Merchant bank 150 may forward the response to the merchant 140. The merchant ('online merchant') 140 may receive the authentication response and complete the transaction according to the authentication response. If approved, the requestor 105 may successfully complete the purchase. Software application 120 may set a card status to suspended/inactive with the card processor's database 130. Software application may further update the card processor's database 130.

In such e-commerce embodiments, the platform may receive, from a requestor, a request for a purchase, where the request comprises request details associated with the purchase and a link associated with an online merchant. Next, the platform may provide the request to a decision maker associated with the requestor. In some embodiments, the request provided to the decision maker may comprise the link. Then, the platform may receive an approval of the request from the decision maker. Subsequently, the platform may enable a processing of a transaction.

In some embodiments of the present disclosure, the platform may receive the request while the requestor is navigating an online merchant's website. The platform may access the link associated with the online merchant to retrieve product details. The retrieved product details may be included and sent to the decision maker in the purchase request.

In further embodiments, the requestor may request permission for purchasing a product associated with a website the requestor is currently navigating. Additionally, in some embodiments, the platform may enable processing of the transaction via an automated application that navigates checkout in the browser of the decision maker or the requestor. In still further embodiments, the platform may utilize an application programming interface (API) for interfacing with the browser.

Figure 1D:
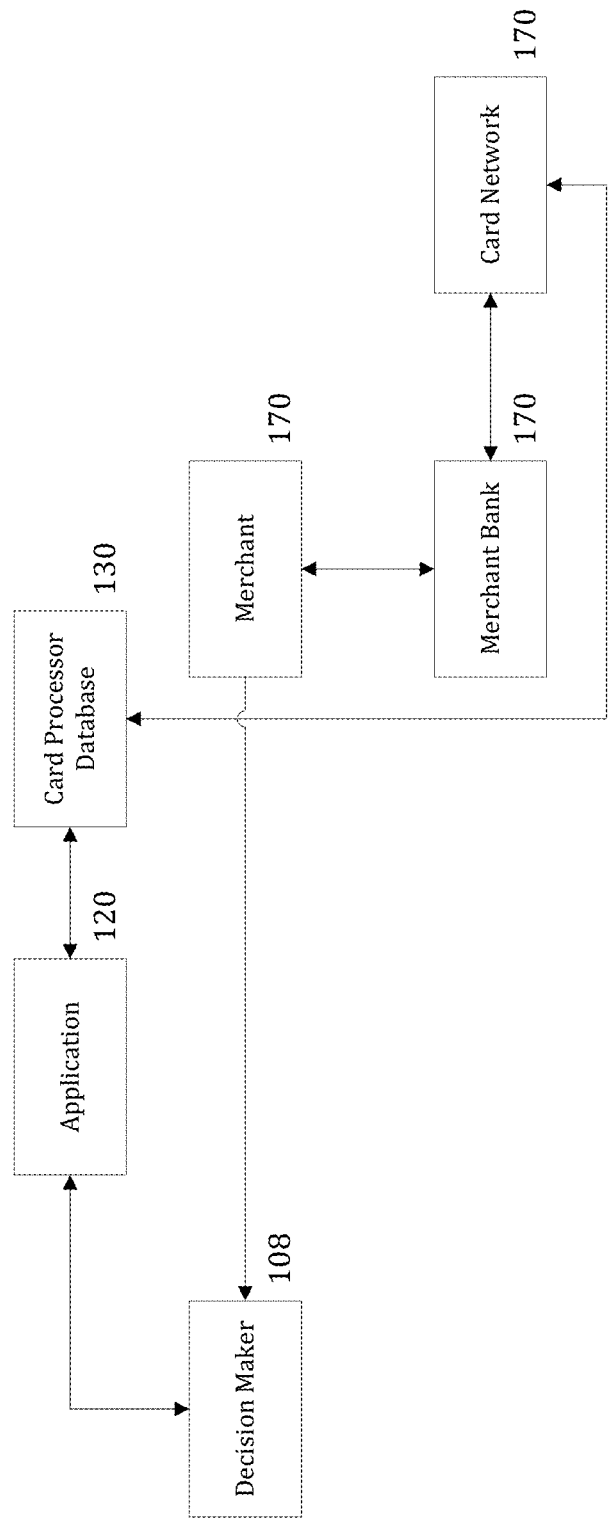
FIG. 1D illustrates a block diagram of an operating environment consistent with the present disclosure.

FIG. 1D illustrates an operating environment for a single-user purchase 100D. Decision maker 108 may use the software application 120 to turn on/enable the card for purchases. Furthermore, decision maker 108 may choose to set other purchase parameters like item, price, store, and timeframe. The software application 120 may update the card processor's database 130 to reflect specific purchase parameters. Merchant 140 may process the platform card and transaction information and request an authentication from a merchant bank 150. The merchant bank 150 may submit authentication to a card network 160. The card network 160 may send a request to the card processor's database 130. The card processor's database 130 may compare the transaction information with the parameters approved by the decision maker 108 and approve or decline the transaction as an authentication response. Card network 160 may forward the authentication response to the merchant bank 150. Merchant bank 150 may forward the response to the merchant 140. The merchant 140 may receive the authentication response and complete the transaction according to the authentication response. If approved, the decision maker 18 may successfully complete the purchase. Software application 120 may set a card status to suspended/inactive with the card processor's database 130.

III. Platform Operation a. Mobile/Web Application

Figure 2A:
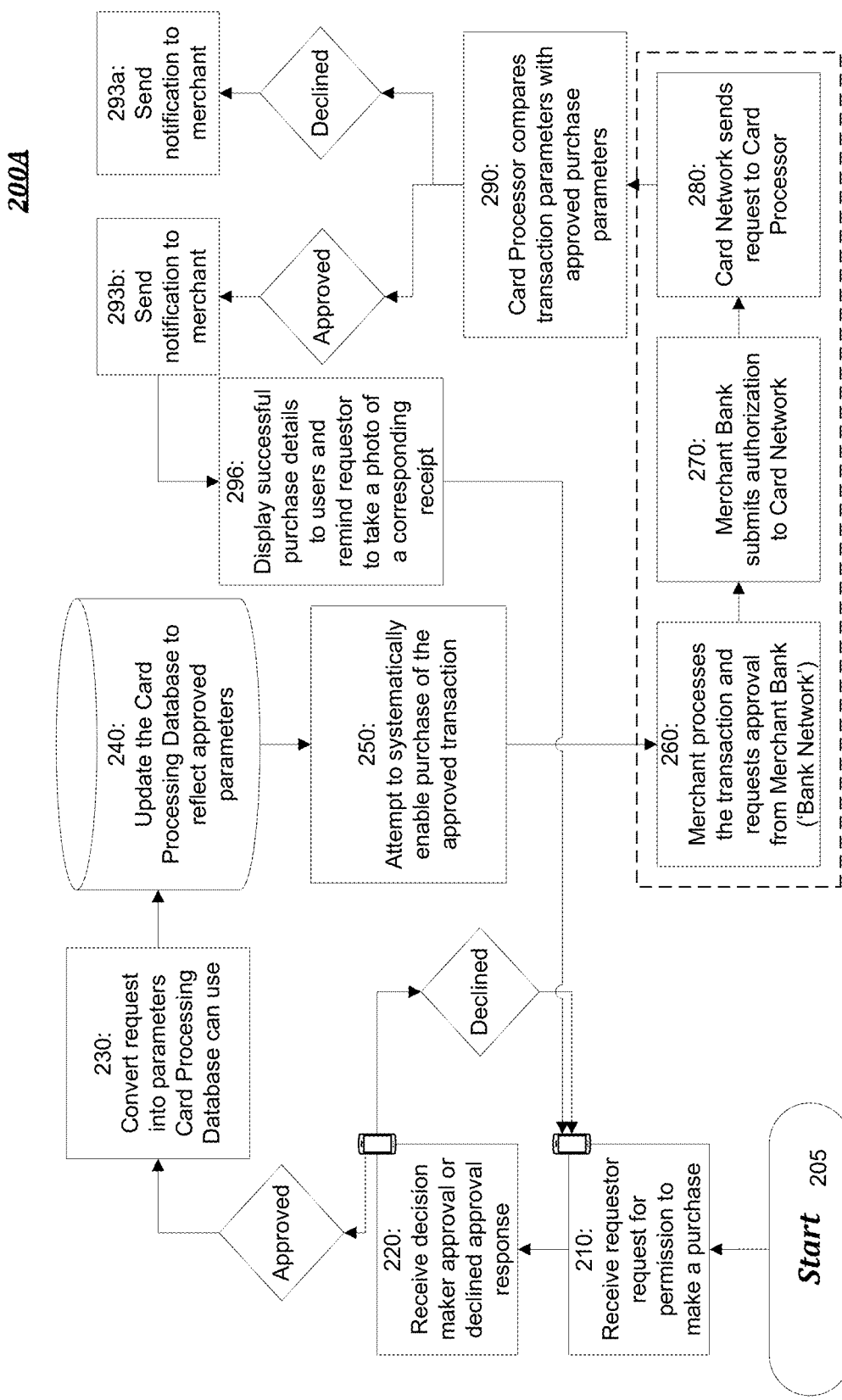
FIG. 2A is a flow chart of a method for providing a payment approval platform.

FIG. 2A is a flow chart setting forth the general stages involved in a method 200A consistent with an embodiment of the disclosure for providing a payment approval platform 100. Method 200A may be implemented using a computing device 1100 as described in more detail below with respect to FIG. 11.

Although the following methods have been described to be performed by platform 100, it should be understood that computing device 1100 may be used to perform the various stages of the methods. Furthermore, in some embodiments, different operations may be performed by different networked elements in operative communication with computing device 1100. For example, server 110 may be employed in the performance of some or all of the stages in the methods. Moreover, server 110 may be configured much like computing device 1100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of the methods will be described in greater detail below.

Method 200A may begin starting block 205 where the platform may receive user account information. For example, the platform may receive user account information for a decision maker and a requestor. User account information may include, for example, but not be limited to, first and last name, address, phone number, email, date of birth, gender, and account password. In further embodiments, the platform may enable the decision maker to provide approval via a link to an e-commerce platform as an alternative to approving an in-store point of sale approval. The platform may then assign the requestor and decision maker each with a unique identifier (e.g., GL-XXXX). Account information may further include a role (e.g., decision maker or requestor). The decision maker may then be associated with one or more requestors ('relationships'). Each user's account may further be associated with a financial institution. For example, the decision maker's account may be linked to a bank account, credit card account, etc. In some embodiments, the requestor's account may be associated with a financial institution through the decision maker's account.

Figure 4:
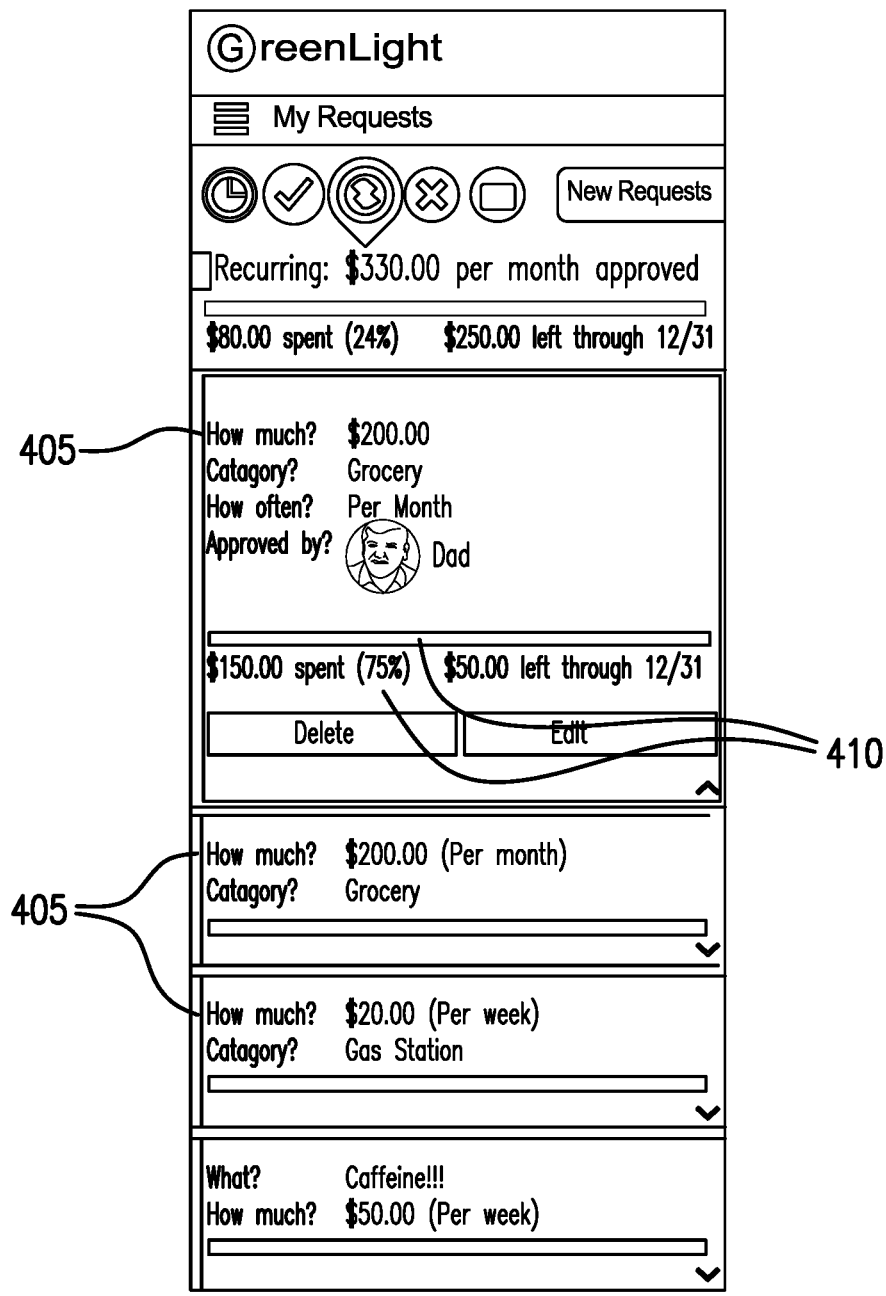
FIG. 4 illustrates an interface showing recurring purchase requests, as well as relevant information pertaining to such recurring requests

From starting block 205, where the platform receives account information, method 200A may proceed to proceed to stage 210 where platform 100 may receive a purchase request. For example, a requestor may request to purchase a pair of pants with the software application. While embodiments of the present disclosure are described from the context of a purchase made at a point of sale, it should be understood that embodiments may further be utilized in a similar fashion as a payment method for, for example, an e-commerce merchant. FIGS. 3A, 3B, 3C, 3D and 3E illustrate interfaces 300A, 300B, 300C, 300D, and 300E, respectively, for receiving purchase request information. Upon receipt of a selection of a "New Request," (e.g., when the requestor presses the "New Request" button 305), the platform may provide the requestor with a plurality of input prompts 310, to input purchase request information ('transactional information') such as, for example, but not limited to, price, merchant/store, geo-fence coordinates, transaction category, date/time limitations of purchase, a photo of the item(s) for purchase, to whom approval should be sent, and comments. In addition, the platform may enable the user to make the purchase request recurring, such as, for example, if the requestor desires to request a weekly grocery budget. FIG. 4 illustrates an interface 400 showing recurring purchase requests 405, as well as relevant information pertaining to such recurring requests (e.g., percent of budget spent 410).

Figure 5:
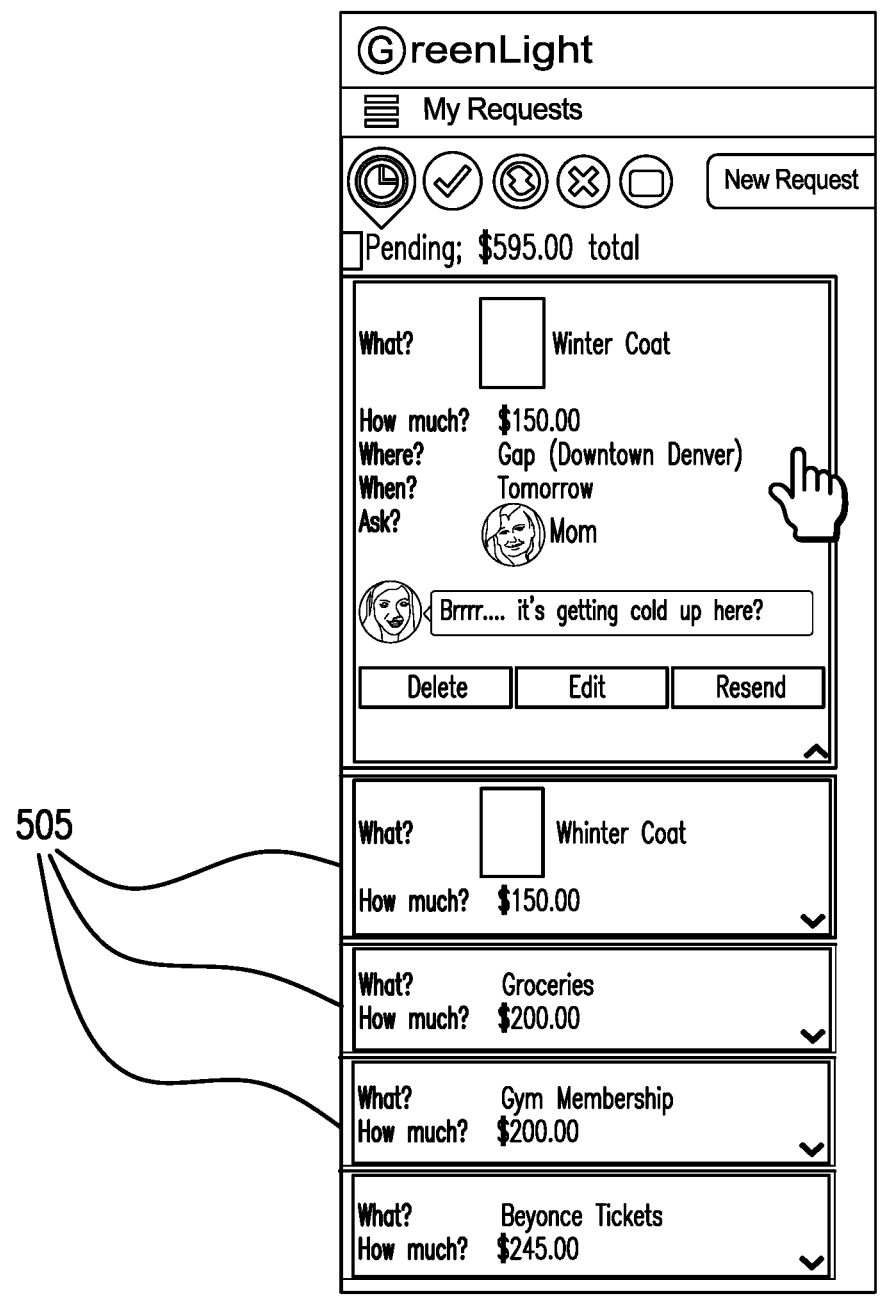
FIG. 5 illustrates an interface showing pending requests.

After receiving purchase request information, the platform may receive a finalization of the purchase request, for example by receiving a selection of the submit request button 315. Platform 100 may then display to the user any pending purchase requests. FIG. 5 illustrates an interface 500 showing pending requests 505.

Figure 6:
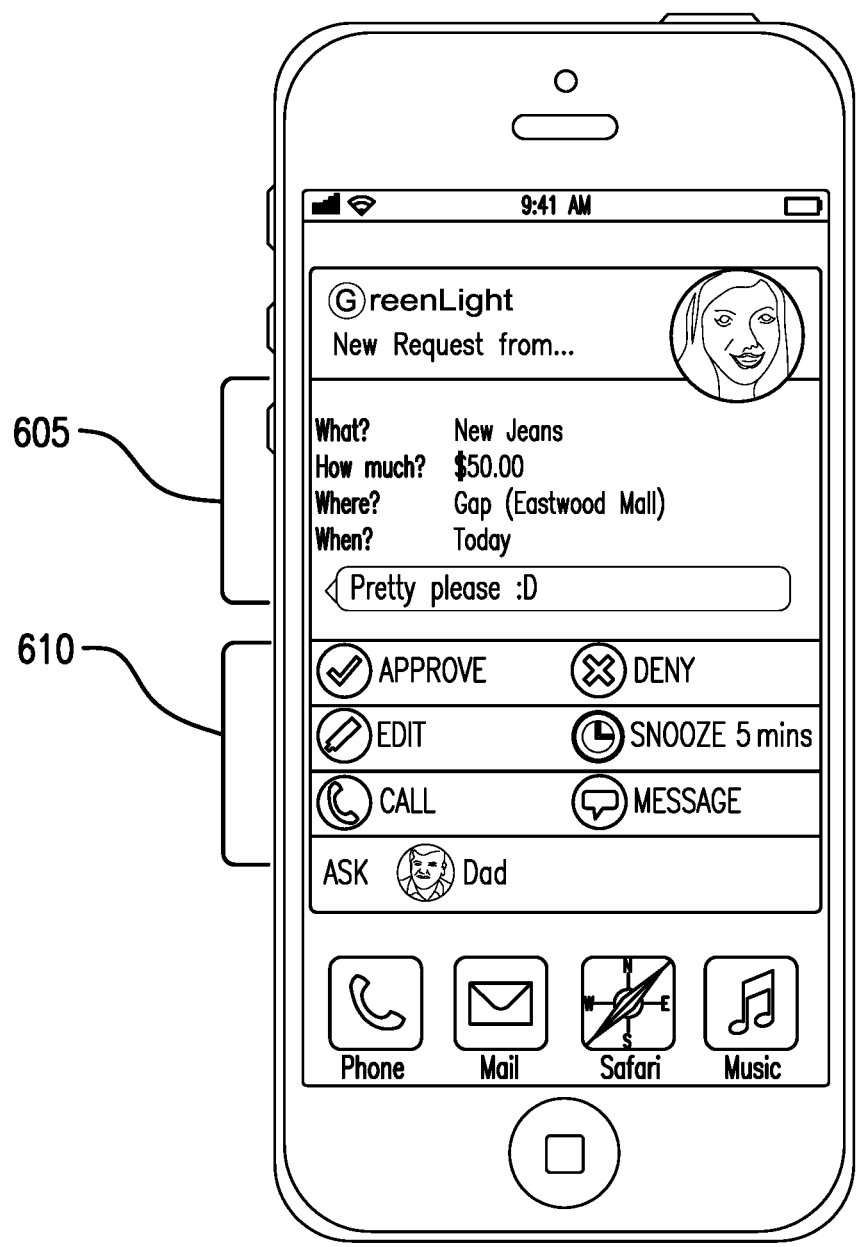
FIG. 6 illustrates an interface showing the notification of a purchase pending approval.

From stage 210, where platform 100 receives purchase request information, method 200A may advance to stage 220 where platform 100 may send a notification to the decision maker and receive a decision. The decision maker may receive a notification, for example, via the software application. In some cases, the decision maker may be the requestor. FIG. 6 illustrates an interface 600 showing the notification. The decision maker may receive purchase request information 605 corresponding to information received from the requestor's input prompts 310. The decision maker may receive a selection of response options 610, such as, for example, accept, reject, call requestor, and message requestor. The platform may further enable the user to edit the desired purchase request information, or provide further purchase limits (e.g., a spending limit, credit limit, account balance, day, time and location). In addition, the platform may enable the user to request to be notified at a later time.

Figure 7:
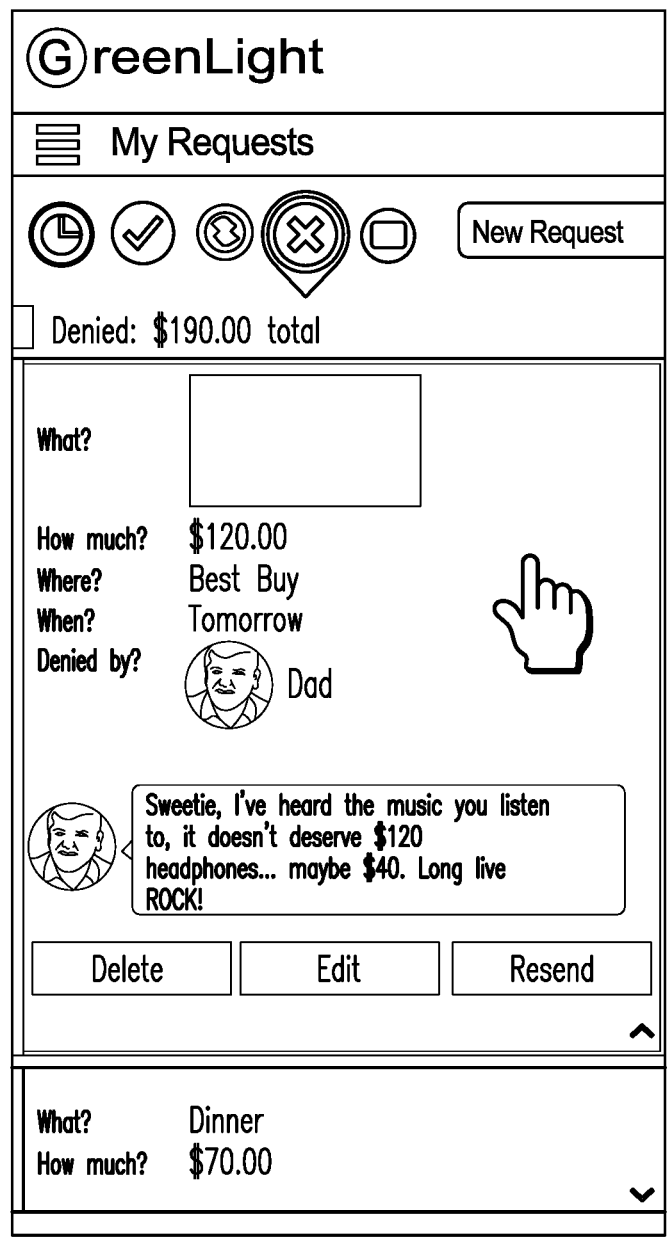
FIG. 7 illustrates an interface showing a rejection of a purchase request.
Figure 8:
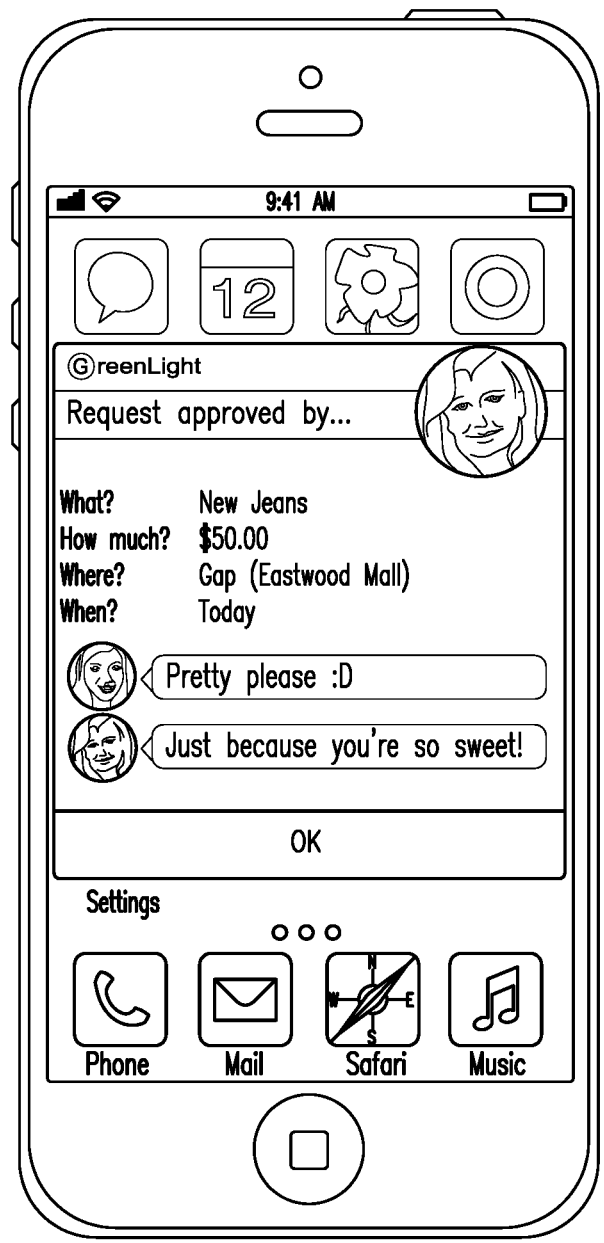
FIG. 8 illustrates an interface showing an approval of a purchase request.

Once platform 100 sends a notification to the decision maker and receives a decision in stage 220, if the platform receives a rejection of the purchase request, method 200A may notify the user. FIG. 7 illustrates an interface 700 showing a rejection of a purchase request. Alternatively, if the platform receives an approval of the purchase request, method 200A may notify the user and proceed to stage 230, where the platform may convert the purchase request details into approved parameters a card processing database can use. FIG. 8 illustrates an interface 800 showing an approval of a purchase request.

Once platform 100 converts the purchase request details into parameters a card processing database can use, method 200A may proceed to stage 240, where platform 100 may update a card processing database to reflect the transaction parameters.

Once platform 100 updates the card processing database to reflect the approved parameters, method 200A may proceed to stage 250, where platform 100 may attempt to systematically purchase the approved transaction via a payment device authentication system. The payment device authentication system may include all facets of a standard electronic fund transfer ('EFT') authentication system such as a merchant bank, issuing bank, and any additional clearing-house entities typically involved in the approval or disapproval of an EFT transaction. In FIG. 1 the payment device authentication system is identified as Card Network and Merchant Bank.

The platform may send a push alert to approve the request. The push alert may be sent, for example, via API, to the card processor. A token may be passed from the merchant to the merchant bank in stage 260. Upon approval of the merchant bank, the merchant bank may then pass the token to the card network in stage 270. Upon further approval of the card network, the card network may pass the token to the card processor in stage 280 for additional approval.

Once platform 100 passes the token to the card processor in stage 280, method 200A may proceed to stage 280, where platform 100 compares the transaction parameters to the purchase details approved by the decision maker. For example, the platform may receive transaction parameters (e.g., geo-location, price, store, and date and time of purchase) received from an e-commerce platform or at a point of sale when the requestor attempts to make the purchase. Platform 100 may then compare the transaction parameters to the approved parameters. If the transaction parameters match the approved parameters, the platform may complete the transaction and notify the merchant in stage 293a. Otherwise, the platform may reject the purchase in stage 293b.

Figure 9:
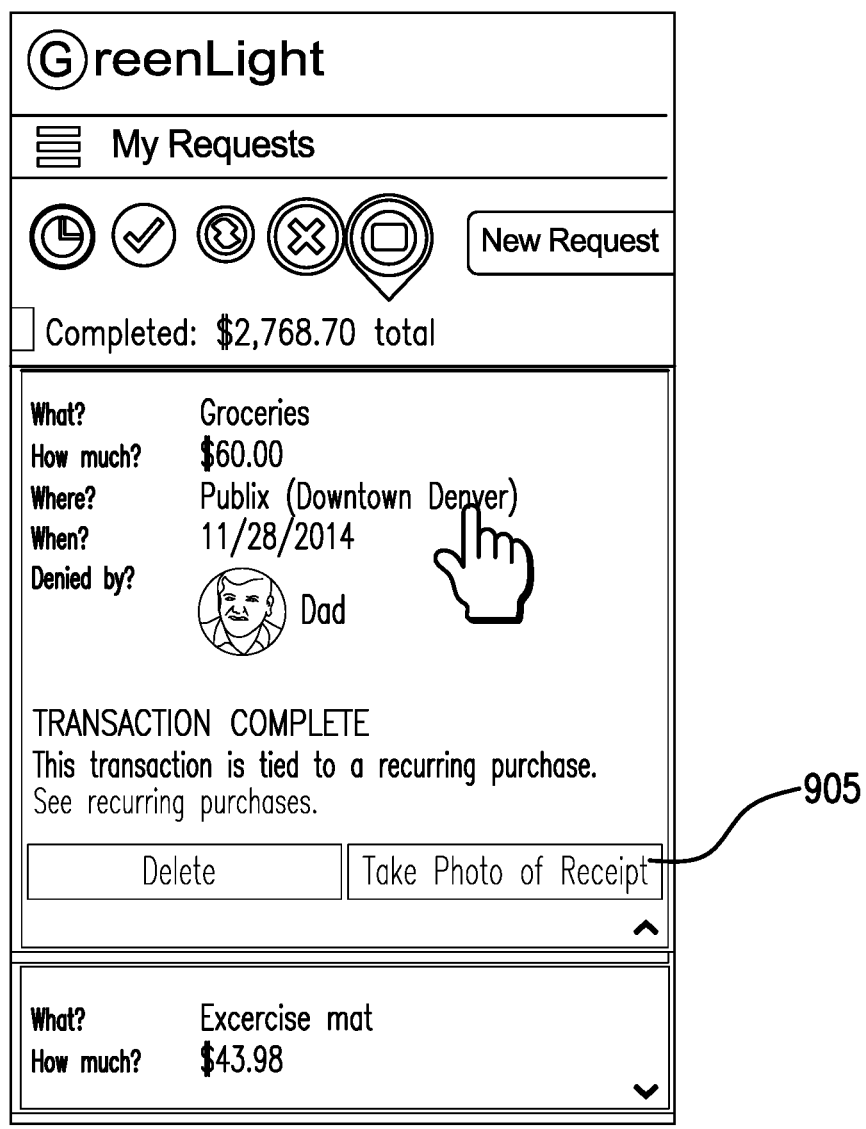
FIG. 9 illustrates an interface showing a successful transaction.

After completing the transaction and notifying the merchant in stage 293, method 200A may proceed to 296, where platform 100 may display the completed purchase details to the users. FIG. 9 illustrates an interface showing a successful transaction 900. The platform may further prompt the requestor to take a photo of a receipt for the successful transaction, for example, by providing a photo button 905.

After platform 100 displays the completed purchasing details to the users and prompts the requestor to take a picture of the receipt in stage 296, method 200A may then end.

b. Online Platform Module (e-Commerce)

Figure 2B:
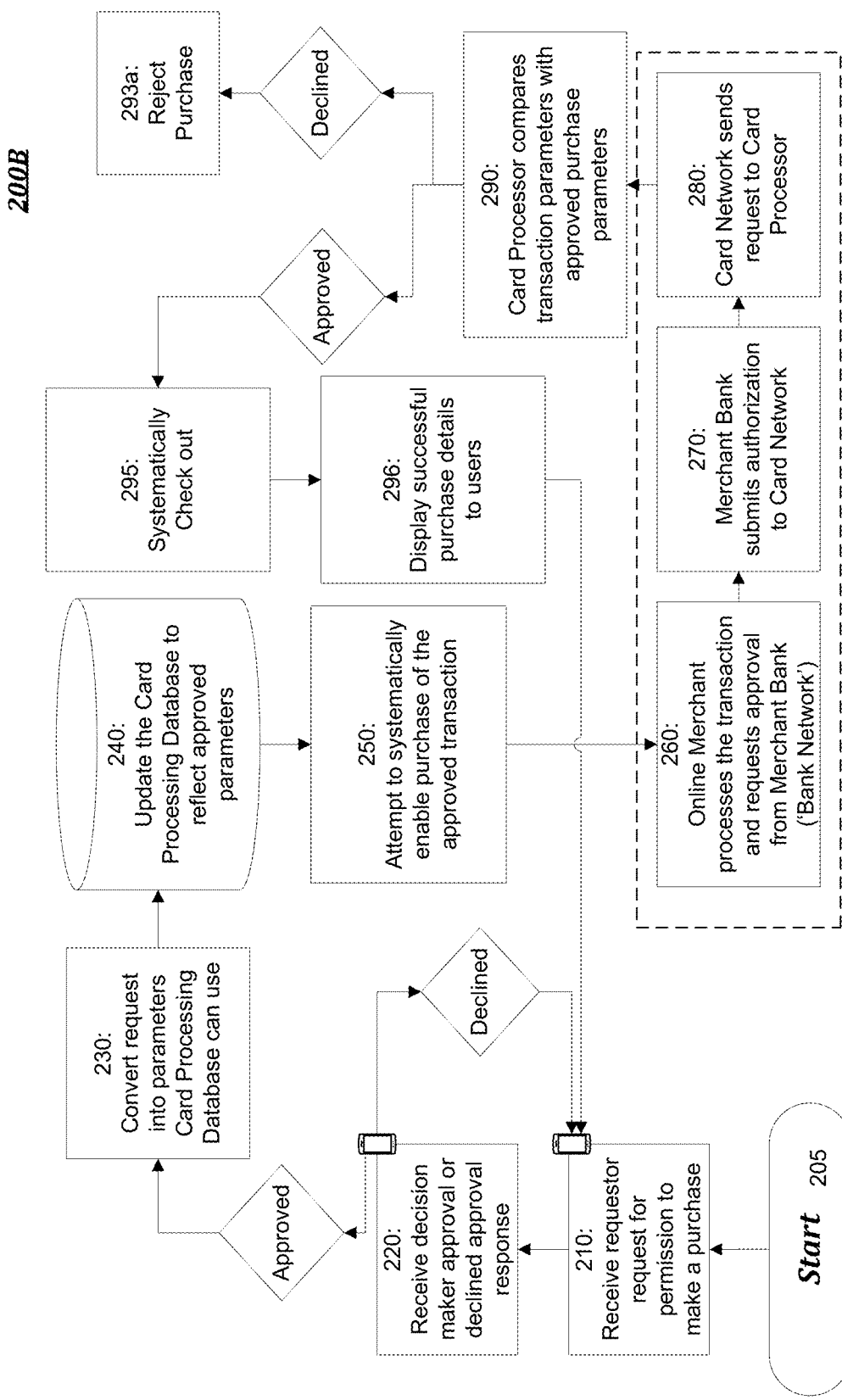
FIG. 2B is a flow chart of a method for providing an e-commerce payment approval platform.

FIG. 2B is a flow chart setting forth the general stages involved in a method 200B consistent with an embodiment of the disclosure for providing a payment approval platform 100. Method 200B may be implemented using a computing device 1100 as described in more detail below with respect to FIG. 11.

Although the following methods have been described to be performed by platform 100, it should be understood that computing device 1100 may be used to perform the various stages of the methods. Furthermore, in some embodiments, different operations may be performed by different networked elements in operative communication with computing device 1100. For example, server 110 may be employed in the performance of some or all of the stages in the methods. Moreover, server 110 may be configured much like computing device 1100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of the methods will be described in greater detail below.

Method 200A may begin starting block 205 where the platform may receive user account information. For example, the platform may receive user account information for a decision maker and a requestor. User account information may include, for example, but not be limited to, first and last name, address, phone number, email, date of birth, gender, and account password. Further information may be associated with requestor and decision maker accounts, such as, for example, registered devices and biometric indicators (e.g., fingerprints), to provide additional security and authentication methods. The platform may then assign the requestor and decision maker each with a unique identifier (e.g., GL-XXXX). Account information may further include a role (e.g., decision maker or requestor). The decision maker may then be associated with one or more requestors ('relationships'). Each user's account may further be associated with a financial institution. For example, the decision maker's account may be linked to a bank account, credit card account, funding account, etc. In some embodiments, the requestor's account may be associated with a financial institution through the decision maker's account. In some embodiments, the platform may receive log-in information from a user for a specific account, such as, for example, an Amazon account.

From starting block 205, where the platform receives account information, method 200B may proceed to proceed to stage 210 where platform 100 may receive a purchase request. For example, a requestor may request to purchase a pair of pants with the software application. FIGS. 3A, 3B, 3C, 3D and 3E illustrate interfaces 300A, 300B, 300C, 300D, and 300E, respectively, for receiving purchase request information. Upon receipt of a selection of a "New Request," (e.g., when the requestor presses the "New Request" button 305), the platform may provide the requestor with a plurality of input prompts 310, to input purchase request information ('transactional information') such as, for example, but not limited to, price, merchant/ store, geo-fence coordinates, transaction category, date/time limitations of purchase, a photo of the item(s) for purchase, to whom approval should be sent, and comments. In some embodiments, platform 100 may receive purchase request information by receiving a URL associated with the item(s)/online shopping cart for purchase and subsequently receiving information attached to the URL.

Consistent with embodiments of the present disclosure, platform 100 may be integrated into an e-commerce website. In this way, a requestor may submit a request for an item via a uniform resource locator (URL) linking to that item. The URL may be copy-pasted by the requestor or automatically retrieved by a plug-in module that may be installed on the web-browser being used by the requestor. In turn, such URL may be associated with the e-commerce website integrated with platform 100. The decision making party may access the URL to review the item. Upon receiving approval from the decision maker, platform 100 may cause a transaction to occur on the e-commerce website—either by integration on a back-end system or by front-end automated-form filing (e.g., via the web-browser plug-in). In further embodiments, the platform may enable the decision maker to provide approval via a link to an e-commerce platform as an alternative to approving an in-store point of sale approval. Accordingly, embodiments of the present disclosure may enable requests for purchases to be sent from a physical location (e.g., in-store) while the approval from the decision maker may be limited to an e-commerce purchase. Similarly, the inverse may be possible in other embodiments of the present disclosure. Thus, while embodiments of the present disclosure are described from the context of a purchase made at a point of sale, it should be understood that embodiments may further be utilized in a similar fashion as a payment method for, for example, an e-commerce merchant.

In addition, the platform may enable the user to make the purchase request recurring, such as, for example, if the requestor desires to request a weekly grocery budget. FIG. 4 illustrates an interface 400 showing recurring purchase requests 405, as well as relevant information pertaining to such recurring requests (e.g., percent of budget spent 410).

After receiving purchase request information, the platform may receive a finalization of the purchase request, for example by receiving a selection of the submit request button 315. Platform 100 may then display to the user any pending purchase requests. FIG. 5 illustrates an interface 500 showing pending requests 505.

The platform may further receive, from the account associated with the requestor which was provided during initial account creation, requestor information, such as, for example, but not limited to, requestor name, address, email, date of birth, gender, and password. In addition, the platform may receive information associated with a decision maker, such as, for example, but not limited to, name, address, email, date of birth, gender, and password. The platform may receive further information associated with the users, such as bank information and an account information.

From stage 210, where platform 100 receives purchase request information, method 200B may advance to stage 220 where platform 100 may send a notification to the decision maker and receive a decision. The decision maker may receive a notification, for example, via the software application. In some cases, the decision maker may be the requestor. FIG. 6 illustrates an interface 600 showing the notification. The decision maker may receive purchase request information 605 corresponding to information received from the requestor's input prompts 310. The decision maker may receive a selection of response options 610, such as, for example, accept, reject, call requestor, and message requestor. The platform may further enable the user to edit the desired purchase request information. In addition, the platform may enable the user to request to be notified at a later time.

Once platform 100 sends a notification to the decision maker and receives a decision in stage 220, if the platform receives a rejection of the purchase request, method 200B may notify the user. FIG. 7 illustrates an interface 700 showing a rejection of a purchase request. Alternatively, if the platform receives an approval of the purchase request, method 200B may notify the user and proceed to stage 230, where the platform may convert the purchase request details into approved parameters a card processing database can use. FIG. 8 illustrates an interface 800 showing an approval of a purchase request.

Once platform 100 converts the purchase request details into parameters a card processing database can use, method 200B may proceed to stage 240, where platform 100 may update a card processing database to reflect the transaction parameters.

Once platform 100 updates the card processing database to reflect the approved parameters, method 200B may proceed to stage 250, where platform may attempt to systematically purchase the approved transaction via a payment device authentication system. The payment device authentication system may include all facets of a standard electronic fund transfer ('EFT') authentication system such as a merchant bank, issuing bank, and any additional clearinghouse entities typically involved in the approval or disapproval of an EFT transaction. In FIG. 1 the payment device authentication system is identified as Card Network and Merchant Bank.

The platform may send a push alert to approve the request. The push alert may be sent, for example, via API, to the card processor. A token may be passed from the merchant to the merchant bank in stage 260. Upon approval of the merchant bank, the merchant bank may then pass the token to the card network in stage 270. Upon further approval of the card network, the card network may pass the token to the card processor in stage 280 for additional approval.

Once platform 100 passes the token to the card processor in stage 280, method 200B may proceed to stage 280, where platform 100 compares the transaction parameters to the purchase details approved by the decision maker. For example, the platform may receive transaction parameters (e.g., geo-location, price, store, and date and time of purchase) received from an e-commerce platform. Platform 100 may then compare the transaction parameters to the approved parameters. If the transaction parameters match the approved parameters, the platform may reject the purchase in stage 293b. Alternatively, if the transaction parameters match the approved parameters, the platform may systematically perform check out in stage 295. For example, the platform may log into the online merchant's webpage with the account information of the decision maker. Then, the platform may automatically fill in the necessary information (e.g., shipping location, payment information, etc.) The platform may then complete the checkout and submit the order.

After systematically checking out in stage 295, method 200B may proceed to 296, where platform 100 may display the completed purchase details to the users. FIG. 9 illustrates an interface showing a successful transaction 900.

After platform 100 displays the completed purchasing details to the users in stage 296, method 200B may then end.

c. Single User

Figure 2C:
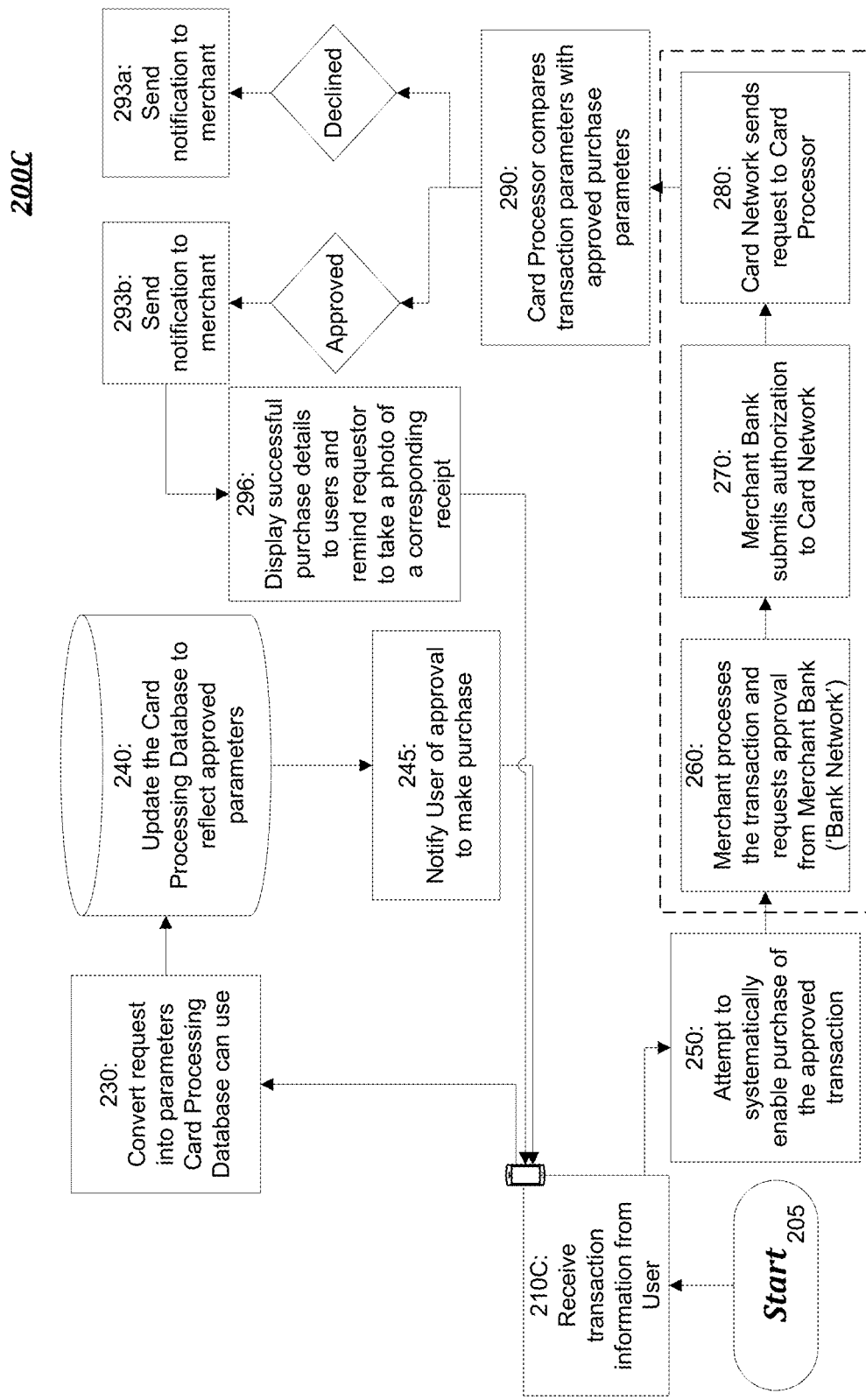
FIG. 2C is a flow chart of a method for providing a single-user payment approval platform.
Figure 3A:
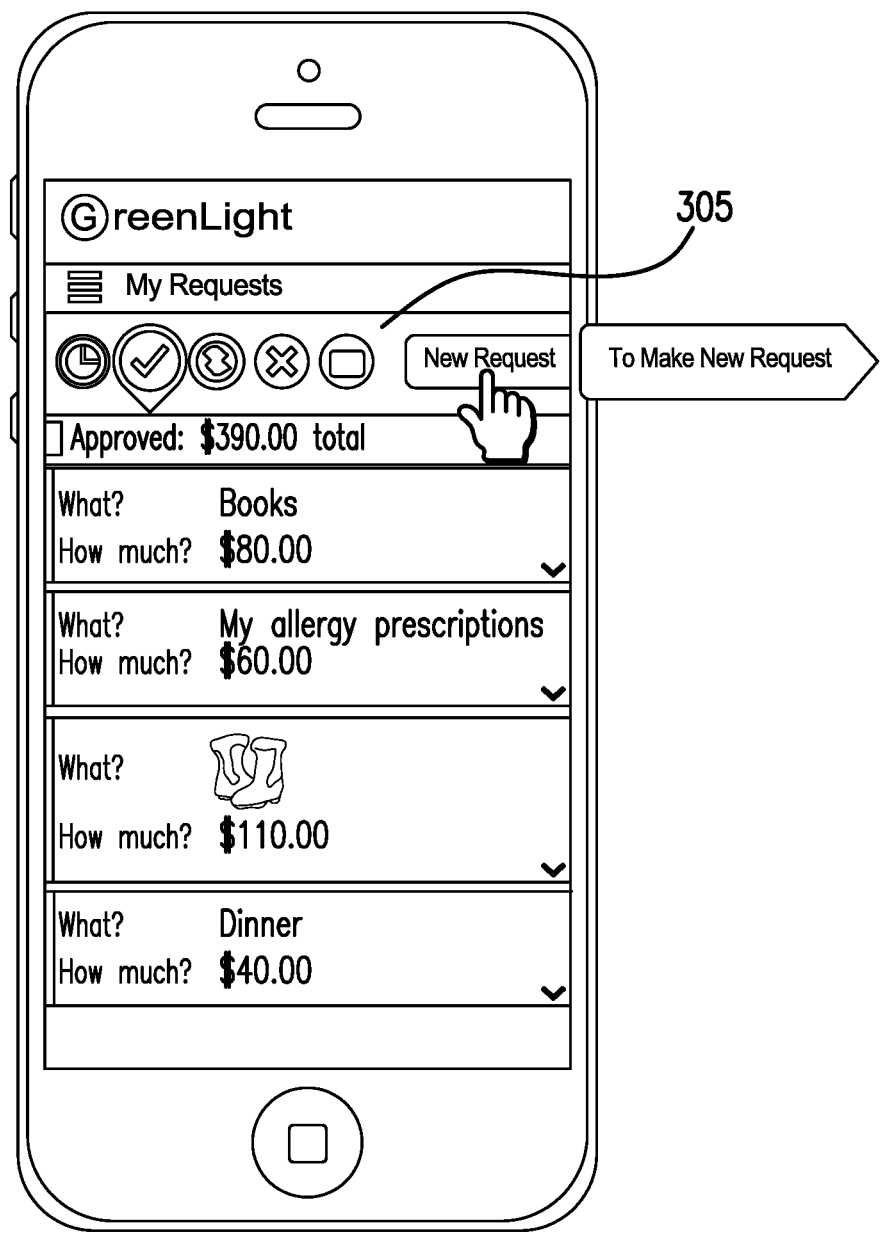
FIG. 3A illustrates an interface for receiving purchase request information from a requestor.
Figure 3B:
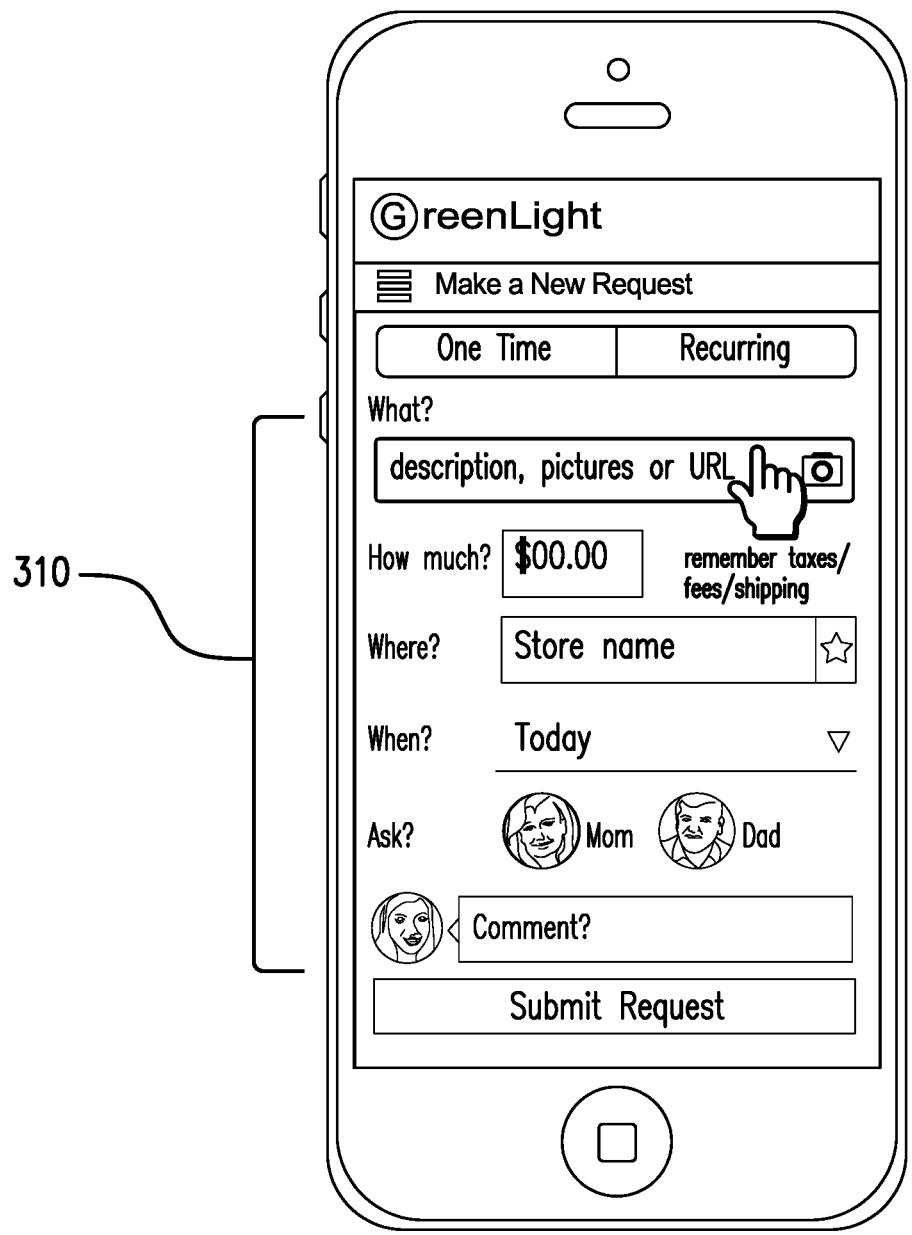
FIG. 3B illustrates another interface for receiving purchase request information from a requestor.
Figure 3C:
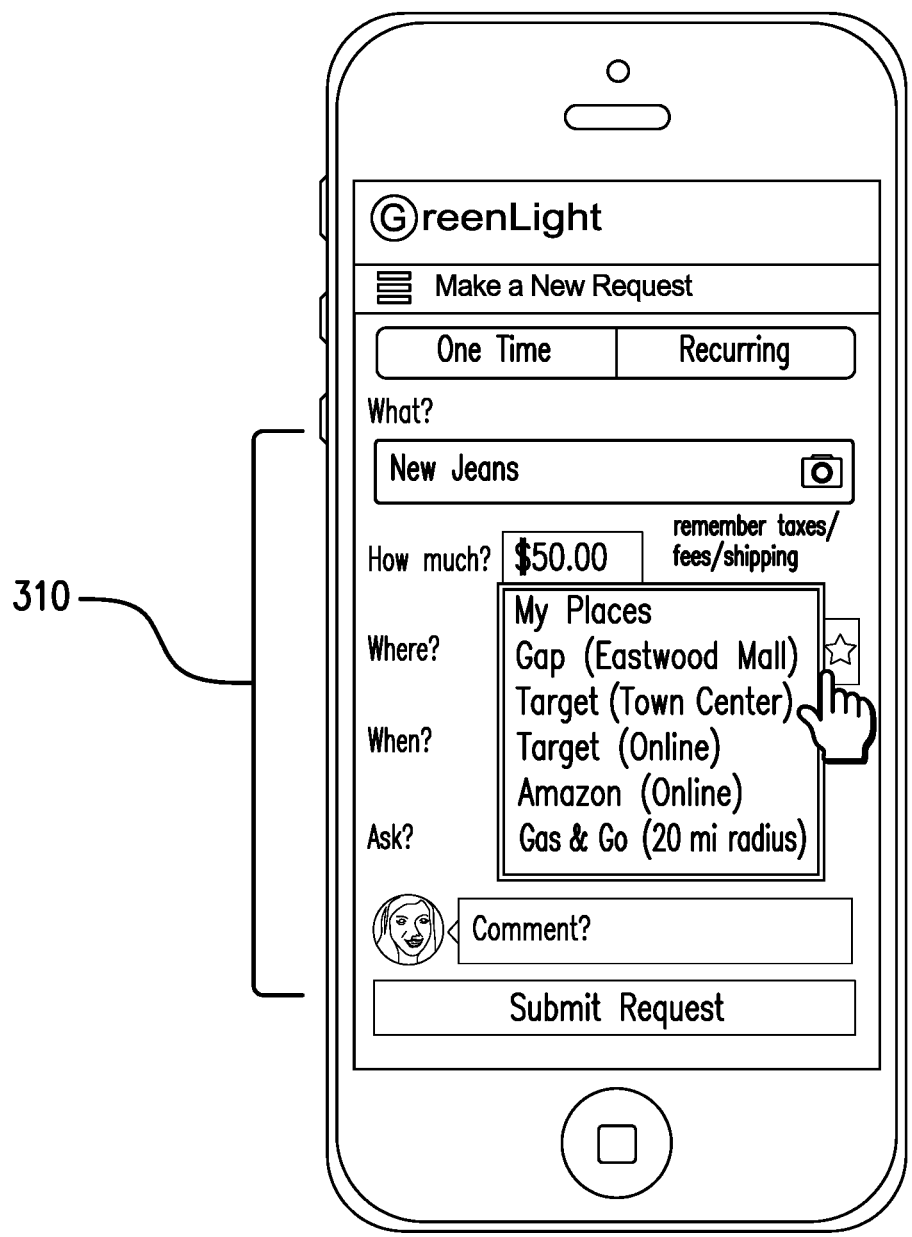
FIG. 3C illustrates yet another interface for receiving purchase request information from a requestor.
Figure 3D:
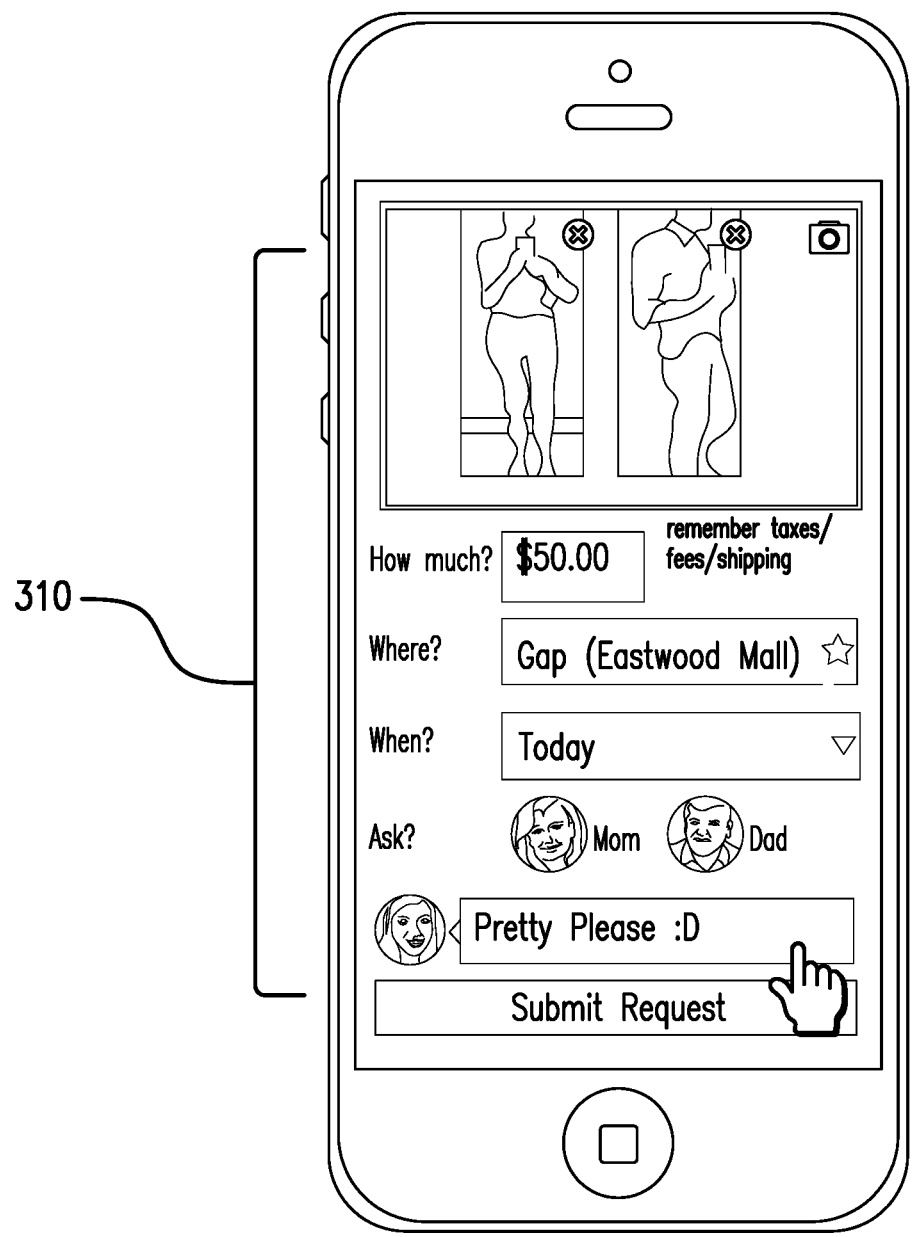
FIG. 3D illustrates still another interface for receiving purchase request information from a requestor.
Figure 3E:
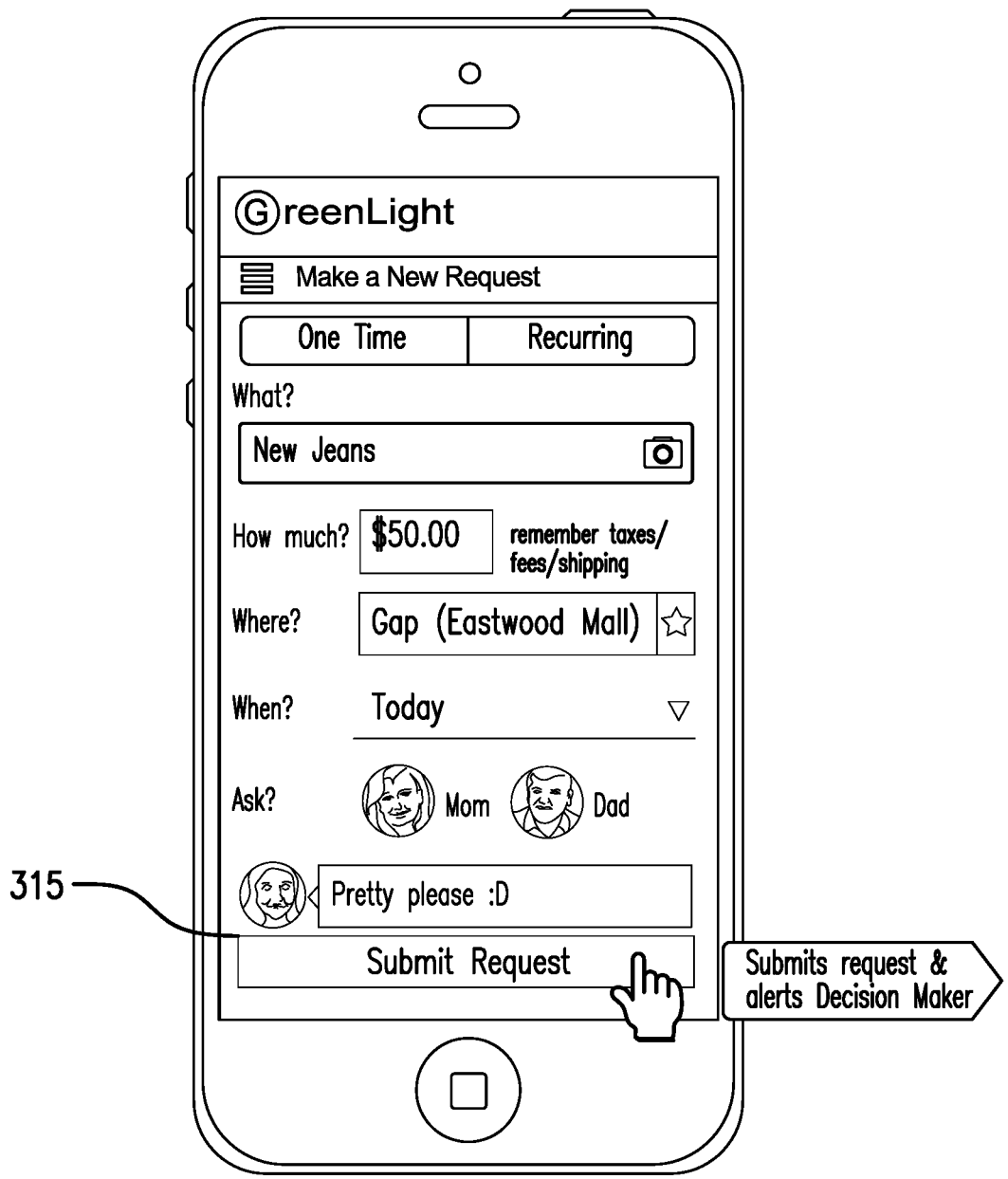
FIG. 3E illustrates another interface for receiving purchase request information from a requestor.

FIG. 2C is a flow chart setting forth the general stages involved in a method 200C consistent with an embodiment of the disclosure for providing a payment approval platform 100. Method 200 may be implemented using a computing device 1100 as described in more detail below with respect to FIG. 11.

Although the following methods have been described to be performed by platform 100, it should be understood that computing device 1100 may be used to perform the various stages of the methods. Furthermore, in some embodiments, different operations may be performed by different networked elements in operative communication with computing device 1100. For example, server 110 may be employed in the performance of some or all of the stages in the methods. Moreover, server 110 may be configured much like computing device 1100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of the methods will be described in greater detail below.

Method 200C may begin starting block 205 where the platform may receive user account information. For example, the platform may receive user account information for a decision maker. User account information may include, for example, but not be limited to, first and last name, address, phone number, email, date of birth, gender, and account password. Further information may be associated with the decision maker account, such as, for example, registered devices and biometric indicators (e.g., fingerprints), to provide additional security and authentication methods. The platform may then assign the user account with a unique identifier (e.g., GL-XXXX). Account information may further include a role (e.g., decision maker or requestor). The user's account may further be associated with a financial institution. For example, the user's account may be linked to a bank account, credit card account, funding account, etc. In some embodiments, the requestor's account may be associated with a financial institution through the decision maker's account. In some embodiments, the platform may receive log-in information from a user for a specific account, such as, for example, an Amazon account.

From starting block 205, where the platform receives account information, method 200C may proceed to stage 210, where platform 100 may receive a purchase request. For example, a single user may request to purchase a pair of pants with the software application. FIGS. 3A, 3B, 3C, 3D and 3E illustrate interfaces 300A, 300B, 300C, 300D, and 300E, respectively, for receiving purchase request information. Upon receipt of a selection of a "New Request," (e.g., when the requestor presses the "New Request" button 305), the platform may provide the user with a plurality of input prompts 310, to input purchase request information ('transactional information') such as, for example, but not limited to, price, merchant/store, geo-fence coordinates, transaction category, date/time limitations of purchase, a photo of the item(s) for purchase. In addition, the platform may enable the user to make the purchase request recurring, such as, for example, if the requestor desires to request a weekly grocery budget. FIG. 4 illustrates an interface 400 showing recurring purchase requests 405, as well as relevant information pertaining to such recurring requests (e.g., percent of budget spent 410).

After receiving purchase request information, the platform may receive a finalization of the purchase request, for example by receiving a selection of the submit request button 315.

Once platform 100 receives purchase request information in stage 210C, method 200C may proceed to stage 230, where the platform may convert the purchase request details into approved parameters a card processing database can use. FIG. 8 illustrates an interface 800 showing an approval of a purchase request.

Once platform 100 converts the purchase request details into parameters a card processing database can use, method 200C may proceed to stage 240, where platform 100 may update a card processing database to reflect the transaction parameters.

Once platform 100 updates the card processing database to reflect the approved parameters, method 200C may proceed to stage 245, where platform 100 may notify the user of an approval to make the purchase. For example, the platform may send a pop-up notification to the user and/or provide a display of approved purchases.

Once platform 100 notifies the user of the approval to make the purchase, method 200C may proceed to stage 250, where platform may attempt to systematically purchase the approved transaction via a payment device authentication system. The payment device authentication system may include all facets of a standard electronic fund transfer ('EFT') authentication system such as a merchant bank, issuing bank, and any additional clearinghouse entities typically involved in the approval or disapproval of an EFT transaction. In FIG. 1 the payment device authentication system is identified as Card Network and Merchant Network.

The platform may send a push alert to approve the request. The push alert may be sent, for example, via API, to the card processor. A token may be passed from the merchant to the merchant bank in stage 260. Upon approval of the merchant bank, the merchant bank may then pass the token to the card network in stage 270. Upon further approval of the card network, the card network may pass the token to the card processor in stage 280 for further approval.

Once platform 100 passes the token to the card processor in stage 280, method 200C may proceed to stage 280, where platform 100 compares the transaction parameters to the purchase details approved by the decision maker. For example, the platform may receive transaction parameters (e.g., geo-location, price, store, and date and time of purchase) received from an e-commerce platform or at a point of sale when the requestor attempts to make the purchase. Platform 100 may then compare the transaction parameters to the approved parameters. If the transaction parameters match the approved parameters, the platform may complete the transaction and notify the merchant in stage 293*a*. Otherwise, the platform may reject the purchase in stage 293*b*.

After completing the transaction and notifying the merchant in stage 293, method 200C may proceed to 296, where platform 100 may display the completed purchase details to the users. FIG. 9 illustrates an interface showing a successful transaction 900. The platform may further prompt the requestor to take a photo of a receipt for the successful transaction, for example, by providing a photo button 905.

After platform 100 displays the completed purchasing details to the users and reminds the requestor to take a picture of the receipt in stage 296, method 200C may then end.

Embodiments of the present disclosure may enable a requestor to request permission to purchase an item via platform 100. The request may include various parameters associated with the item. Such parameters may include card status, geo-fence coordinates, time frame for purchase, individual transaction amount, product code, etc.

This request for permission may be sent to a decision maker and the decision maker may approve or decline the request. If approved, platform 100 may convert the request into parameters relating to the transaction and transmit this information to a card processor's database. In some embodiments, the card processor's database may be specific to the payment device such as, for example, a card issued by the provider of platform 100 (e.g. GreenLight credit card, GreenLight database), while in other embodiments other payment processors may be used. Accordingly, platform 100 may provide the card processor's database with specific transactional information.

The requester may be notified that the transaction has been approved and that the payment device (e.g., an approved card or, for example, the platform provider's card) may be capable of being utilized for finalizing the transaction. The requester may then attempt to make the purchase in the store or online per the methods disclosed above. The merchant may processes the payment device and the information may be submitted to the merchant bank for authentication. In some embodiments, processing may occur as follows. The merchant bank may subsequently send the request for authentication to the card network. The financial processing network may send the request to the card processor's database. The card processor's database may compare the transaction parameters received from card network with the information previously authorized by the decision maker. If the parameters as compared match, the transaction may be approved. If the parameters as compared do not match, the transaction may be declined and the respective decision may be processed back to the merchant.

Still consistent with embodiments of the present disclosure, a payment device specific to the EFT approval interface may be utilized. When the payment device is utilized, a card processor's database may interface with an EFT approval interface for storing approval information.

A requestor ('requestor'), such as, for example, a teenager, may utilize platform 100 to request to purchase a specific item such as a pair of skinny jeans which cost a certain amount as seventy five dollars, at a specific store as J Crew, at a specific location such as a certain mall as Lenox Mall in Atlanta Georgia, on a specific date as Sep. 30, 2014, at a certain time as 2 P.M.

A decision maker, such as, for example, a parent, may receive the request via t platform 100 and approve or decline the request utilizing platform 100. Upon approval, platform 100 may update the associated card processor's database associated with t platform 100 to reflect the specific approved parameters. The parameters may include, for example, the dollar amount, the item being purchased, the store location, the time, and any combination of these data points related to the transaction.

The merchant may process the payment device and request authentication from the merchant bank. The merchant bank may submit the authentication request to the payment device authentication system. The payment device authentication system may submit the request to the associated card processor's database associated with platform 100. The approval information contained in the database may be compared with the transactional information submitted by the payment device authentication system. If the information meets the approved criteria by matching certain parameters, the associated card processor's database may send an approval to the payment device authentication system. If the parameters do not match, then the transaction may not be approved. The decision may subsequently be returned to the merchant bank and merchant for further completion or declining the transaction.

In yet further embodiments of the present disclosure, the payment device used to complete a transaction may be turned "off", meaning that the card is deactivated and utilization of the card would automatically result in the payment device not processing, as it would be identified as inactive. In order to turn the payment device "on" meaning that the payment device could be utilized for a sales transaction, the card must first be authorized for a particular transaction.

The payment device such as a platform card may be utilized for payment of a transaction. In order for the payment device to be utilized, a first person, who is the approver or decision maker of the payment device, and who is typically the owner of the payment device, may submit approval information. The approval information which contains information specifically related to the transaction t which subsequently submits the approval information to the payment device authentication system. When the point of sale transaction is initiated at a merchant, sale transactional information, which includes information specifically related to the transaction, may be submitted to the merchant bank and the payment device authentication system for approval. During the approval process, the transactional information may be compared to the approval information. The information specifically related to the transaction of transactional information may be compared to the information specifically related to the approval information. If the comparison determines that the information components are matched, then the transaction may be approved. In this embodiment, the merchant may be on site or virtual (e-commerce).

The payment device may be turned "off" such that the utilization of the payment device when "off" will result in the transaction may be denied. Furthermore, when the device is turned "on" meaning that the payment device may be utilized for a fulfillment of tendering payment for completion of a transaction, the payment device may not successfully be utilized for tendering of payment unless the specific transaction associated with turning the payment device on is conducted. This may be ensured by associating specific transactional information with the turning "on" of the payment device and comparing this specific transactional information with the actual transaction conducted. Only then will the transaction be approved.

A unique payment device may be identified. The payment device may be an EFT suitable device which has a first and second status. The first status may be "off," wherein the card may be unable to be utilized for any transaction and may be denied authentication to be utilized as a medium for completing a sales transaction. The card may have a second status wherein the card is "on" meaning that the card may be utilized as a medium for completing a sales transaction. However, the card may be turned "on" by identifying associated parameters relating to a particular transaction.

These associated parameters may be provided to an intermediary database associated with the issuer of the card. Subsequently, when the sales transaction is conducted, the associated parameters may be compared with the actual transaction and only then may the transaction be allowed. If the payment device is utilized for an unauthorized transaction, the payment device may have a third status wherein the card is "on" but unauthorized.

Embodiments of the present disclosure may be utilized in a virtual merchant environment wherein the merchant is utilized for completing an e-commerce transaction. In these embodiments, the requestor may accesses a virtual merchant for purchasing an item. In this embodiment, additional information may be provided to the decision maker via the online merchant. For instance, the requestor may forward a particular web address to the decision maker that may have a specific product and related URL such that a specific product may be purchased. The decision maker, in seeing the specific item, may approve the specific item by utilizing the URL information or product information. Additionally, the virtual merchant environment may present two distinctive purchasing scenarios. The grantor may approve the transaction, and the requestor may communicate directly with the virtual merchant for purchasing the desired item. Alternatively, the grantor may access the website via the URL and directly purchase the item on behalf of the requestor.

In some embodiments, the transaction may include the usage of a prepaid card. In such embodiments, the prepaid card may include a set amount that has previously been allocated for this card. When the transaction is undertaken, the respective available funds may be accessed for payment for the transaction.

In operation, the unique payment device may have a second or third factor authentication security system. In some of the embodiments disclosed, a first person identified as the requestor, may access an application software program, which may be, for example, on a mobile device or computer. Access by the first person may be accomplished utilizing a first user identification parameter and a first user password. The first user identification parameter and first user password may be unique to the first user defining a first factor of authentication. This first factor of authentication may be required to access the application software for defining a user request. The second factor of authentication which may be required may include the "approver". The approver may receive the request via the application software associated with his or her respective interface device which may be, for example, a computer, smartphone, tablet, iPad, or the like. Accessing the application software application via the respective interface device may require a second user identification parameter and a second user password. The second user identification parameter and the second user password singularly or combined may constitute the second factor of authentication. The approver may receive a request for a purchase by the requestor via the application software, which may require the first and second factors of authentication. When the approver approves the requested purchase, the parameters related to the transaction may be uploaded via the application software to the card network. The transactional parameters may be integrated into the card information stored in the card network. When the transaction is initiated at the merchant, the same transactional parameters may be forwarded to the card network for comparison with the transactional parameters previously submitted via the system upon the approval by the approver. This transactional parameter may present a third factor of authentication.

Integration of the transactional parameter with the card information stored in the card network may be an important part of the invention and constitutes the third factor of authentication. The electronic fund transfer system may utilizes the standard for exchanging information relating to electronic transactions made by cardholders using payment cards. The International Organization for Standardization for such systems may utilize ISO 8583 standards for electronic financial transactions utilizing payment cards. As previously identified, an EFT system utilizing a card-based transaction may utilize a series of networks to a card issuing system for authentication against a card holder's account.

The transaction data may contain information derived from the card, such as, for example, the account number, the terminal, (e.g., the merchant number), the transaction (e.g., the amount), together with other data which may be typically generated throughout intervening systems in the network. Within ISO 8583 data, elements may be utilized for carrying out the financial transactions. The data elements may be individual fields which carry the transactional information throughout the transaction and also with the issuing bank. There may be up to 128 data elements specified in the original 1987 ISO 8583 standard. Some modifications to the standard have been made, but a unified standard of the data elements may exist.

In some embodiments of the present disclosure, the application software may generate transactional information, which may be uploaded to the issuing bank database, which may contain the specific customer information relating to a card based transaction device. For example, the issuing bank database utilizing ISO 8583 may have standard information such as, for example, the primary account number, the transaction amount, the settlement amount, transmission date and time, merchant type, and other information as defined by the standard.

In some embodiments of the present disclosure, certain data fields of the issuing bank customer record may be updated to reflect transactional parameters unique to the desired transaction, which has been approved by the grantor and assumed to be carried out by the requestor. Such transactional parameters, which may be transmitted by the application software and related database to the issuing bank database may include, for example, a status field (e.g. turning the card 'on' or 'off'), a set dollar amount for the desired transaction, a max transaction amount, a geo fence approval which would identify a general location for the transaction to occur, a timeframe for the desired transaction, and a specific category for the transaction such as apparel, gas, food, etc.

Figure 10:
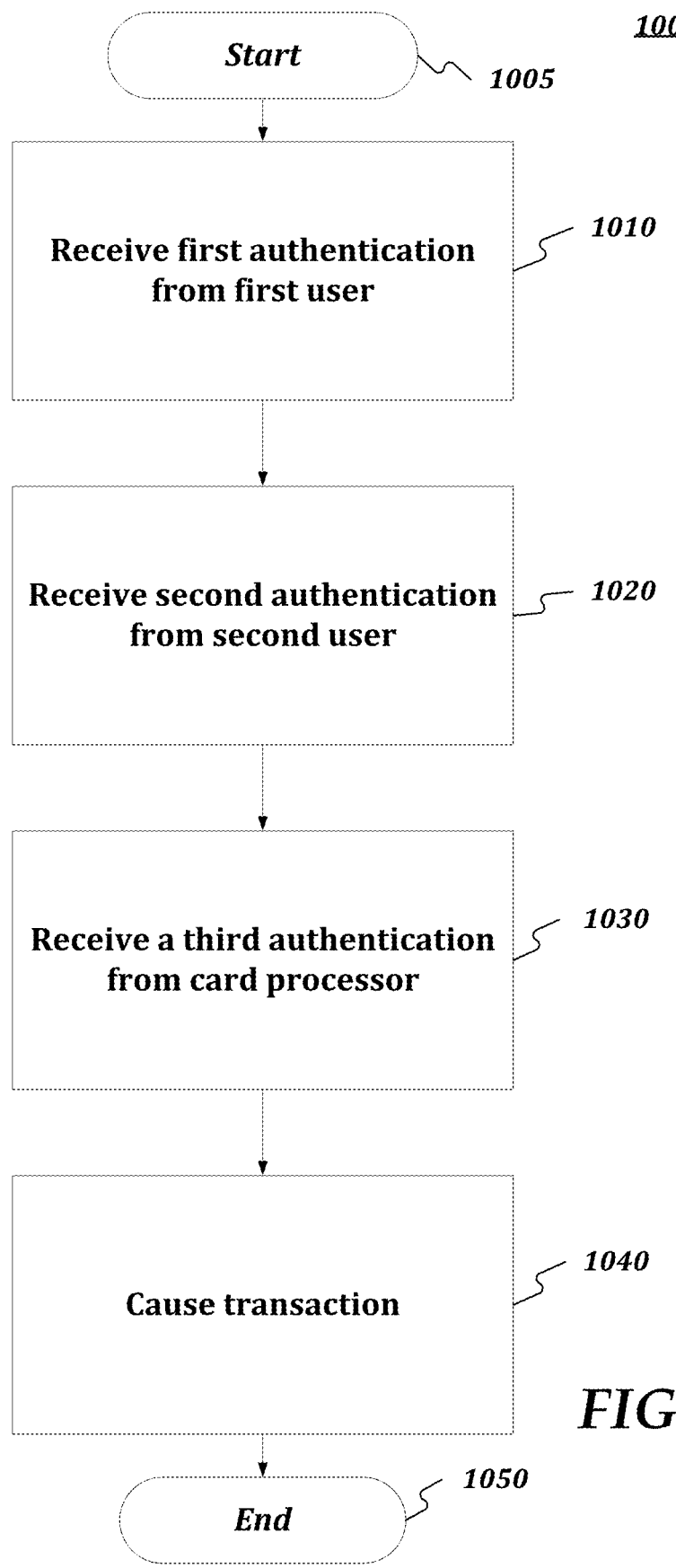
FIG. 10 is a flow chart setting forth the general stages involved in a method 1000 consistent with an embodiment of the disclosure for providing a three-tier payment approval method with platform 100.

FIG. 10 is a flow chart setting forth the general stages involved in a method 1000 consistent with an embodiment of the disclosure for providing a three-tier payment authorization method with platform 100. Method 1000 may be implemented using a computing device 1100 as described in more detail below with respect to FIG. 11.

Method 1000 may begin at starting block 1005 and proceed to stage 1010, where platform 100 may receive a first authorization from a first user. The first user may provide the first authorization by providing purchase request parameters. The purchase request parameters may comprise, for example, but not limited to, a purchase description, an amount of funds, a store (or geo-fence location), a date of purchase, and a second user for a second authorization. The first authorization parameters may be received, for example, from a requestor in stage 210 above. The first user may additionally provide a payment method, such as, for example a payment card. The payment card may be associated with card parameters (e.g., card number, expiration date, and card verification value (CVV)). The first authorization may additionally include, the first user's access credentials, such as, for example, a first username and password, which may, in turn, be authenticated by the platform.

From stage 1010, where platform 100 receives a first authorization from a first user, method 1000 may proceed to stage 1020 where platform 100 may receive a second authorization from a second user, such as, for example, a decision maker in stage 220 above. The second user may provide authorization by approving the request, as well as providing additions or modifications to the purchase request. The second authorization may further include, the second user's access credentials such as, for example a second username and password as provided by the second user, which may, in turn, be authenticated by the platform.

Upon receiving a second authorization from a second user in stage 1020, method 1000 may proceed to stage 1030, where platform 100 may receive a third authorization, for example from a card processor, bank, or other financial institution. For example, platform 100 may receive approval if the card processor finds the card parameters to match (e.g., card number, expiration date, and card verification value (CVV)). The card processor may further verify that sufficient funds are available in the user's account. Additionally, the platform may receive purchase parameters from a check out and compare the purchase parameters to the purchase request parameters. The platform may provide authorization upon authentication of the card parameters, verification of fund sufficiency, and matching of purchase parameters and purchase request parameters (collectively, "payment details"). Conversely, platform 100 may receive declined approval if the card processor finds inconsistent card parameters, insufficient funds available in the user's account, or the purchase parameters do not match the purchase request parameters.

Upon receipt of the third authorization in stage 1030, method 1000 may proceed to stage 1040, where platform 100 may cause with the transaction. Upon causing the transaction in stage 1040, method 1000 may end at stage 1050.

IV. Platform Architecture

The purchase approval platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, platform 100 may be hosted on a centralized server, such as, for example, a cloud computing service. Although method 200 has been described to be performed by a computing device 1100, it should be understood that, in some embodiments, different operations may be performed by different networked elements in operative communication with computing device 1100.

Embodiments of the present disclosure may comprise a system having a memory storage and a processing unit. The processing unit may be coupled to the memory storage, wherein the processing unit is configured to perform the stages of method 200.

Figure 11:
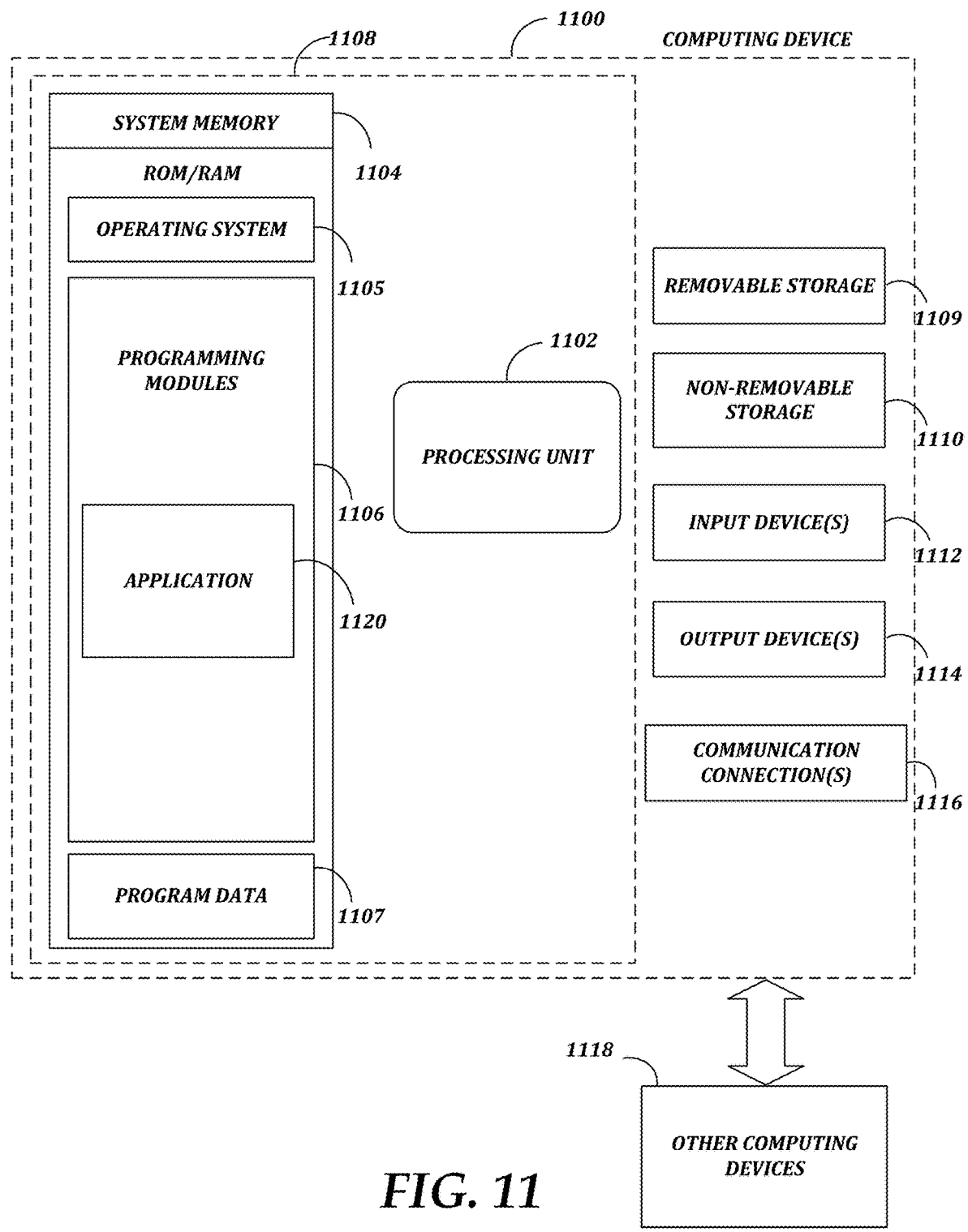
FIG. 11 is a block diagram of a system including a computing device for performing the method of FIG. 2.

FIG. 11 is a block diagram of a system including computing device 1100. Consistent with an embodiment of the disclosure, the aforementioned memory storage and processing unit may be implemented in a computing device, such as computing device 1100 of FIG. 11. Any suitable combination of hardware, software, or firmware may be used to implement the memory storage and processing unit. For example, the memory storage and processing unit may be implemented with computing device 1100 or any of other computing devices 1118, in combination with computing device 1100. The aforementioned system, device, and processors are examples and other systems, devices, and processors may comprise the aforementioned memory storage and processing unit, consistent with embodiments of the disclosure.

With reference to FIG. 11, a system consistent with an embodiment of the disclosure may include a computing device, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include authentication modules, such as, for example software application 1120 referenced throughout the present disclosure as part of platform 100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1104, including operating system 1105. While executing on processing unit 1102, programming modules 1106 (e.g., requestor approval application 1120) may perform processes including, for example, one or more of the methods' stages as described above. The aforementioned process is an example, and processing unit 1102 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method for authorizing an electronic payment to complete a transaction, the method comprising:
  receiving electronically, from a first remote mobile device associated with a requestor, a transactional approval request for a purchase via a payment device controlled by a decision maker associated with the requestor, wherein the payment device is associated with the requestor and an issuing bank, wherein the payment device is configured for use by the requestor, the transactional approval request comprising purchase parameters associated with the purchase;

electronically requesting the first remote mobile device to provide a first authentication factor;

upon electronically receiving the first authentication factor, electronically providing the transactional approval request to a second remote mobile device associated with the decision maker before the requester attempts to use the payment device to complete the purchase, wherein the decision maker approves or denies use of the payment device by the requestor;

electronically requesting the second remote mobile device to provide a second authentication factor;

upon electronically receiving the second authentication factor, electronically receiving via the second remote mobile device an approval of the transactional approval request from the decision maker;

electronically sending the approval of the transactional approval request to the first remote mobile device, wherein the requestor is then authorized to use the payment device to carry out the transaction with a merchant;

electronically receiving transaction information from the merchant associated with the purchase initiated by the requestor with the payment device via the issuing bank, wherein the transaction information is sent electronically from the merchant to the issuing bank;

providing a third authentication factor by comparing the transaction information from the merchant to the purchase parameters approved by the decision maker, wherein the third authentication factor is provided when the transaction information matches the purchase parameters; and upon receipt of the third authentication factor and after the approval for the transactional approval request has been received, enabling a processing of a transaction by the issuing bank upon receipt of the third authentication factor by activating the payment device and notifying the issuing bank to allow the transaction.

2. The method of claim 1, further comprising deactivating the payment device for use by the requestor when no third authentication factor is received to prevent the processing of the transaction.

3. The method of claim 1, further comprising:
upon electronically receiving the approval of the request from the second remote device associated with the decision maker, activating the payment device associated with the requestor for use by the requestor.

4. The method of claim 3, further comprising deactivating the payment device after completion of the transaction.

5. The method of claim 1, further comprising, prior to enabling the processing of the transaction, determining that the transaction information is within a purchase limit specified, by the decision maker, for the payment device.

6. The method of claim 1, wherein both the purchase parameters and the transaction information include at least one of the following: a price, a venue, geo-fence coordinates, and a time limit for an approved transaction.

7. The method of claim 1, further comprising receiving at least one limit to the transaction, the limit being specified by the decision maker in the approval, wherein the at least one limit to the transaction is updated and included in the purchase parameters.

8. The method of claim 7, wherein receiving the at least one limit to the transaction comprises receiving at least one of the following: geo-fence coordinates, a cost limit, an approved venue, an approved vendor, and a time limit.

9. The method of claim 1, wherein electronically requesting the first remote mobile device to provide a first authentication factor further comprises receiving a requestor username and a requestor password and authenticating the requestor username with the requestor password, and wherein electronically requesting the second remote mobile device to provide a second authentication factor further comprises receiving a decision maker username and a decision maker password and authenticating the decision maker username with the decision maker password.

10. The method of claim 1, wherein enabling the processing of the transaction by notifying the issuing bank to allow the transaction comprises passing a token to a payment processor.

11. The method of claim 1, further comprising:
receiving an amount of available funds on the payment device from the issuing bank;
verifying that the amount of available funds on the payment device from the issuing bank is sufficient for the purchase; and
preventing the transaction if the amount of available funds is insufficient for the request for the purchase.

12. The method of claim 1, before a transaction approval request has been received, further comprising:
associating an account of the requestor with an account of the decision maker;
associating the payment device associated with the decision maker with the requestor; and
using funds from the payment device in processing the transaction.

13. The method of claim 1, wherein the approval includes the purchase parameters.

14. The method of claim 13, wherein the decision maker can modify the purchase parameters before sending the approval.

15. The method of claim 1, wherein the first authentication factor and the second authentication factor comprise biometric indicators.

16. The method of claim 1, wherein the first authentication factor and the second authentication factors comprises confirmations via the mobile remote devices of the requestor and the decision maker.

17. The method of claim 1, wherein the payment device remains deactivated until the third authentication factor is received.

18. A non-transitory computer-readable medium comprising a set of instructions which when executed perform a method for authorizing, an electronic payment to complete a transaction, the method comprising:
creating an account for a decision maker associated with a first remote device, creating the account comprising:
generating a first authentication factor for verification purposes; and
registering a payment device associated with the decision maker and a requestor, wherein the payment device is used by the requester and controlled by the decision maker;
creating an account for the requestor associated with a second remote device, creating the requestor account comprising:

generating a second authentication factor for verification purposes; and
associating the requestor with the decision maker and the payment device,
electronically receiving a specification of a purchase limit with the payment device for use by the requestor from the first remote device of the decision maker for the requestor;
before the requestor attempts to use the payment device to complete a purchase, enabling the second remote device associated with the requestor to send a. purchase request associated with the payment device to the first remote device associated with the decision maker upon the second remote device providing the second authentication factor, the purchase request requesting the decision maker to allow the requestor to make a purchase using the payment device and comprising at least one of the following: the request identifying an item and a price of the item;
upon receiving the first authentication factor from the first remote device, receiving the decision maker's approval to enable the requestor to purchase the item with the payment device;
enabling the requestor to carry out the purchase of the item with the payment device at a merchant; and
after the approval has been received, enabling a transaction to be processed comprising:
generating a third authentication factor when:
the price of the item of the request approved by the decision maker matches a price of the item received from the merchant associated with the transaction when the requestor attempts the purchase; and
the purchase limit is equal to or greater than the price of the item, and activating the payment device to carry out the transaction.

19. A system for authorizing a transaction by a requestor using a payment device controlled by a decision maker, the system comprising:
a server comprising:
a communication connection configured to allow communication with remote mobile computing devices associated with the requestor and the decision maker and servers associated with a merchant associated with the transaction and an issuing bank associated with the payment device;
a memory storage; and
a processing unit coupled to the memory storage, wherein the processing unit is operative to:
create a decision maker account for the decision maker, wherein the account includes decision maker information and the payment device;
create a requestor account for the requestor;
associate the requestor with the decision maker and the payment device, wherein the payment device is used by the requestor;
enable the decision maker to set purchase limits for the requestor with the payment device;
before the requestor attempts to use the payment device to complete the transaction, enable the remote mobile device of the requestor to electronically send a purchase request for the transaction using the payment device to the remote mobile device of the decision maker after the remote mobile device of the requestor provides a first authentication factor, wherein the purchase request comprises purchase parameters associated with the transaction;
receive the decision maker's approval for the purchase request, wherein the approval includes updated purchase parameters;
after the approval for the purchase request has been received, enable a transaction to be processed if:
the remote mobile device of the decision maker provides a second authentication factor;
the transaction associated with the purchase request by the requestor is within the purchase limits; and
upon providing a third authentication factor, the third authentication factor provided when the purchase parameters associated with the transaction initiated by the requestor with the payment device and approved by the decision maker match transaction information provided by the merchant handling the transaction, wherein the transaction is enabled by the processing unit activating the payment device.

20. The system of claim 19, wherein the purchase parameters and the transaction information comprise at least one of the following: a price, a venue, geo-fence coordinates, and a time limit for an approved transaction.

* * * * *